US008755675B2

(12) United States Patent
Direnzo et al.

(10) Patent No.: US 8,755,675 B2
(45) Date of Patent: Jun. 17, 2014

(54) FLEXIBLE AND EFFICIENT MEMORY UTILIZATION FOR HIGH BANDWIDTH RECEIVERS, INTEGRATED CIRCUITS, SYSTEMS, METHODS AND PROCESSES OF MANUFACTURE

(75) Inventors: Michael T. Direnzo, Coppell, TX (US); Assaf Sella, Plano, TX (US); Manish Goel, Plano, TX (US); Srinivas Lingam, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 2074 days.

(21) Appl. No.: 11/733,831

(22) Filed: Apr. 11, 2007

(65) Prior Publication Data

US 2007/0247936 A1 Oct. 25, 2007

Related U.S. Application Data

(60) Provisional application No. 60/745,237, filed on Apr. 20, 2006.

(51) Int. Cl.
*H04N 5/76* (2006.01)

(52) U.S. Cl.
USPC ........... 386/294; 386/247; 386/263; 386/267; 386/268; 386/273

(58) Field of Classification Search
USPC .................................. 386/247, 263, 267, 268
See application file for complete search history.

(56) References Cited

U.S. PATENT DOCUMENTS

| | | | |
|---|---|---|---|
| 5,175,841 A | 12/1992 | Magar et al. | |
| 5,212,742 A | 5/1993 | Normile et al. | |
| 5,933,855 A * | 8/1999 | Rubinstein | 711/200 |
| 6,085,413 A * | 7/2000 | Klassen et al. | 29/840 |
| 6,466,962 B2 | 10/2002 | Bollella | |
| 6,625,719 B2 | 9/2003 | Leach et al. | |
| 6,724,329 B2 * | 4/2004 | Casper | 341/106 |
| 6,754,509 B1 | 6/2004 | Khan et al. | |
| 6,819,670 B1 * | 11/2004 | Fenner | 370/392 |
| 6,988,234 B2 | 1/2006 | Han | |
| 7,023,931 B2 | 4/2006 | Magee et al. | |
| 7,120,771 B2 | 10/2006 | Dahan et al. | |
| 7,139,320 B1 | 11/2006 | Singh et al. | |
| 7,145,906 B2 * | 12/2006 | Fenner | 370/392 |
| 8,078,919 B2 * | 12/2011 | Garia | 714/47.1 |
| 2002/0031166 A1 | 3/2002 | Subramanian et al. | |

(Continued)

OTHER PUBLICATIONS

Baron, Max, "Five Chips From TI, or Is It Six?" Microprocessor Report, Mar. 17, 2003, pp. 1-6.

(Continued)

*Primary Examiner* — Thai Tran
*Assistant Examiner* — Jose Mesa
(74) *Attorney, Agent, or Firm* — Wade J Brady, III; Frederick J. Telecky, Jr.

(57) ABSTRACT

An electronic circuit (300) includes a signal processing circuit (310) including first and second signal processing blocks (310.1, 310.3) coupled in cascade, a memory circuit (320) coupled to and adjustable between the first and second signal processing blocks (310.1, 310.3), the memory circuit (320) having memory spaces, the memory circuit (320) configurable to establish a trade-off of the memory spaces between the first and second signal processing blocks (310.1, 310.3), and a configuring circuit (330) operable to configure the trade-off of the memory spaces of the memory circuit (320).

43 Claims, 10 Drawing Sheets

(56) References Cited

U.S. PATENT DOCUMENTS

| | | | |
|---|---|---|---|
| 2002/0099854 A1* | 7/2002 | Jorgensen | 709/249 |
| 2003/0078025 A1* | 4/2003 | Smee et al. | 455/307 |
| 2003/0221027 A1 | 11/2003 | Chang et al. | |
| 2003/0235217 A1* | 12/2003 | Verreault | 370/519 |
| 2005/0111416 A1* | 5/2005 | Ginzburg | 370/338 |
| 2005/0114616 A1 | 5/2005 | Tune et al. | |
| 2005/0129042 A1 | 6/2005 | Muhonen et al. | |
| 2005/0143114 A1 | 6/2005 | Moulsley et al. | |
| 2005/0157780 A1* | 7/2005 | Werner et al. | 375/232 |
| 2006/0013346 A1 | 1/2006 | Maalej et al. | |
| 2006/0062390 A1 | 3/2006 | Walker et al. | |
| 2006/0087585 A1 | 4/2006 | Seo et al. | |
| 2006/0128425 A1 | 6/2006 | Rooyen | |
| 2006/0128428 A1* | 6/2006 | Rooyen | 455/553.1 |
| 2006/0222096 A1 | 10/2006 | Guo et al. | |
| 2006/0285484 A1 | 12/2006 | Papasakellariou et al. | |
| 2006/0293077 A1 | 12/2006 | Aaltonen et al. | |
| 2007/0043912 A1 | 2/2007 | Hetherington et al. | |
| 2007/0064835 A1* | 3/2007 | Auranen | 375/316 |
| 2007/0076735 A1 | 4/2007 | Soo | |
| 2007/0294494 A1* | 12/2007 | Conti et al. | 711/158 |
| 2007/0294496 A1 | 12/2007 | Goss et al. | |
| 2008/0108301 A1* | 5/2008 | Dorenbosch | 455/3.06 |
| 2009/0300468 A1* | 12/2009 | Pekonen | 714/776 |

OTHER PUBLICATIONS

"Digital Video Broadcasting (DVB); DVB-H Implementation Guidelines," ETSI TR 102 377 v1.2.1 (Nov. 2005), pp. 31-34, 72-75.

"Hollywood(TM) Mobile Broadcast Single-Chip Solutions: DTV1000 and DRV1001," Texas Instruments, 2005, 2 pp.

* cited by examiner

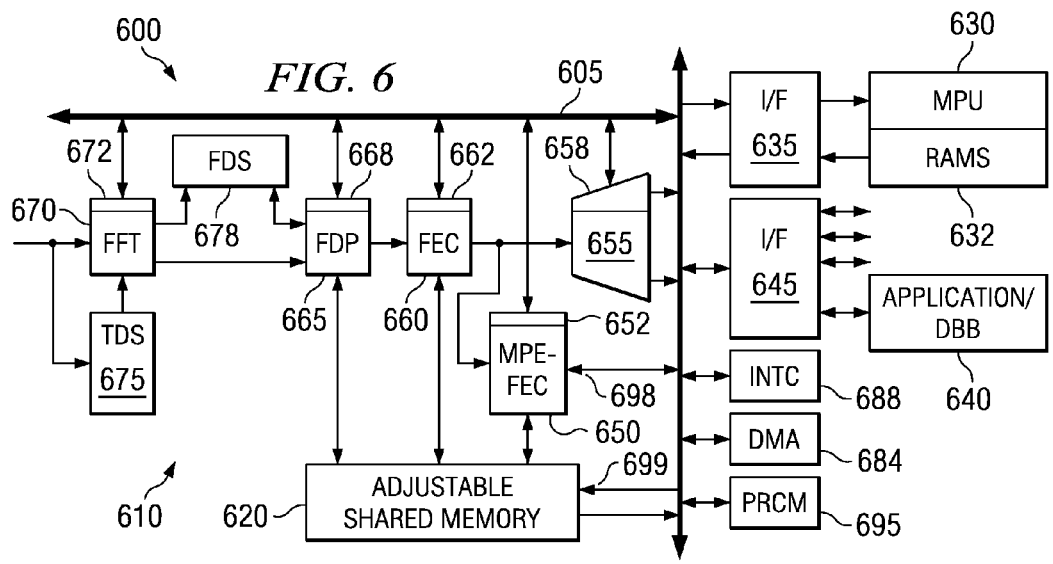
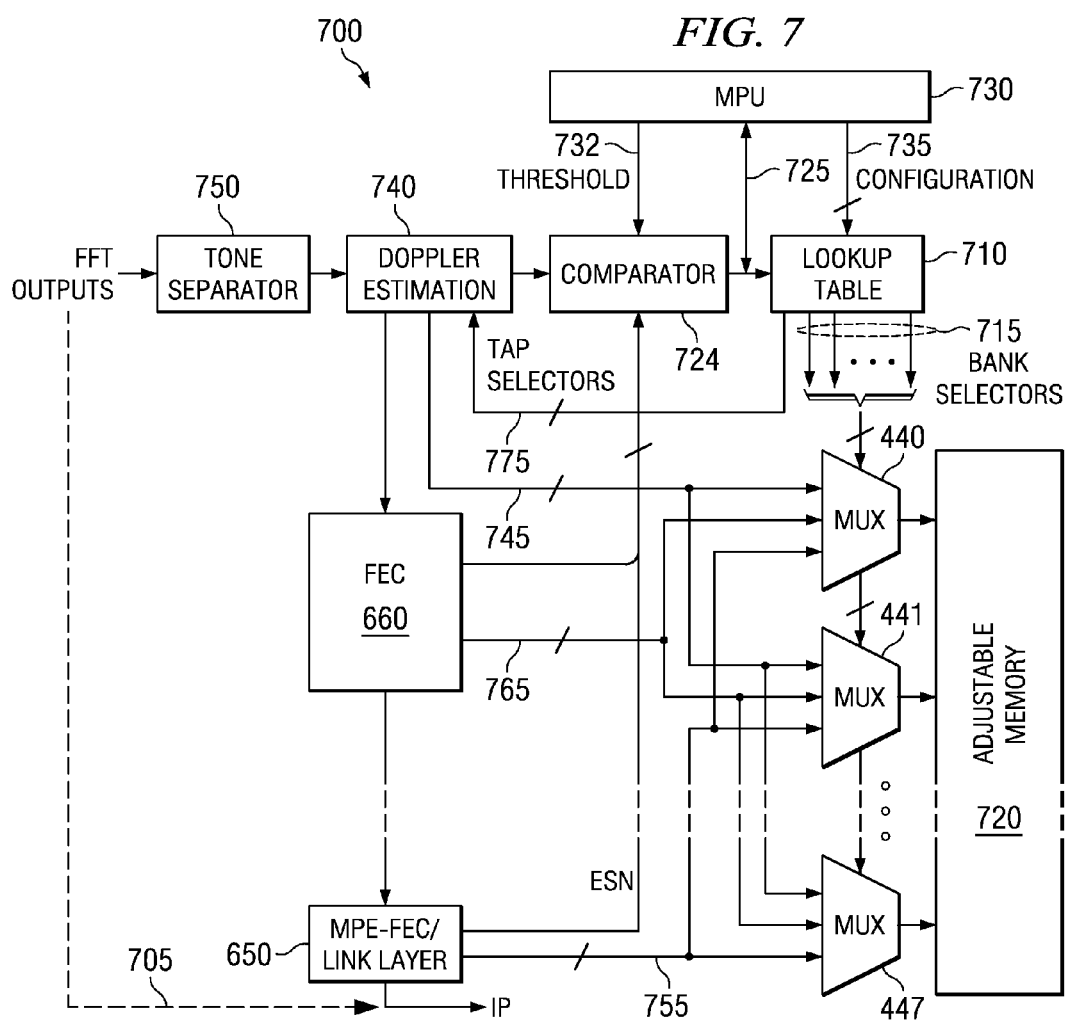

FLEXIBLE AND EFFICIENT MEMORY UTILIZATION FOR HIGH BANDWIDTH RECEIVERS, INTEGRATED CIRCUITS, SYSTEMS, METHODS AND PROCESSES OF MANUFACTURE

CROSS-REFERENCE TO RELATED APPLICATIONS

This application is related to provisional U.S. Patent Application No. 60/745,237, filed Apr. 20, 2006, titled "Flexible and Efficient Memory Utilization for a DVB-H Receiver System," and priority under 35 U.S.C. 119(e)(1) is hereby claimed for said provisional U.S. Patent Application.

STATEMENT REGARDING FEDERALLY SPONSORED RESEARCH OR DEVELOPMENT

Not applicable.

COPYRIGHT NOTIFICATION

Portions of this patent application contain materials that are subject to copyright protection. The copyright owner has no objection to the facsimile reproduction by anyone of the patent document, or the patent disclosure, as it appears in the United States Patent and Trademark Office, but otherwise reserves all copyright rights whatsoever.

BACKGROUND OF THE INVENTION

This invention is in the field of electronic computing hardware and software and communications, and is more specifically directed to improved processes, circuits, devices, and systems for information and communication processing purposes, and processes of making them. Without limitation, the background is further described in connection with communications processing.

Wireline and wireless communications, of many types, have gained increasing popularity in recent years. The personal computer with a wireline modem such as DSL (digital subscriber line) modem or cable modem communicates with other computers over networks. The mobile wireless (or "cellular") telephone has become ubiquitous around the world. Mobile telephony has recently begun to communicate video and digital data, and voice over packet (VoP or VoIP), in addition to cellular voice. Wireless modems for communicating computer data over a wide area network are also available.

Mobile video on cellular telephones and other mobile platforms is increasing in popularity. It is desirable that many streams of information such as video, voice and data should be flexibly handled by such mobile devices and platforms. Precisely because of their mobility, the streams are subject to a distorting process called Doppler effect when moved at speeds commonly encountered in daily life relative to a wireless base station or other wireless transmitter carrying a stream of information to be received. Because of human visual acuity and auditory acuity, the video clarity and audible signal clarity of signals subjected to the Doppler effect distortion can be noticeable unless measures can somehow be taken to minimize the Doppler effect distortion. These considerations would appear to call for added computing power and hardware.

Wireless data communications in wireless mesh networks, such as those operating according to the IEEE 802.16 standard or "WiMax," are increasing over a widening installed base of installations. The wireless mesh networks offer wideband multi-media transmission and reception that also appear to call for substantial computing power and hardware. Numerous other wireless technologies exist and are emerging about which various burdens and demands exist and will arise.

Security techniques are used to improve the security of retail and other business commercial transactions in electronic commerce and to improve the security of communications wherever personal and/or commercial privacy is desirable. Security is important in both wireline and wireless communications and apparently imposes still further demands for computing power and hardware.

Processors of various types, including DSP (digital signal processing) chips, RISC (reduced instruction set computing), information storage memories and/or other integrated circuit devices are important to these systems and applications. Containing or reducing the cost of manufacture and providing a variety of circuit and system products with performance features for different market segments are important goals in DSPs, integrated circuits generally and system-on-a-chip (SOC) design.

Further advantageous solutions and alternative solutions would, accordingly, be desirable in the art.

SUMMARY OF THE INVENTION

Generally and in one form of the invention, an electronic circuit includes a signal processing circuit including first and second signal processing blocks coupled in cascade, a memory circuit coupled to and adjustable between the first and second signal processing blocks, the memory circuit having memory spaces, the memory circuit configurable to establish a trade-off of the memory spaces between the first and second signal processing block, and a configuring circuit operable to configure the trade-off of the memory spaces of the memory circuit.

Generally and in another form of the invention, a signal processing device includes a signal processing circuit including first and second signal processing blocks, a memory circuit coupled to and adjustable between the first and second signal processing blocks, the memory circuit having memory spaces, the memory circuit configurable to establish a trade-off of the memory spaces between the first and second signal processing blocks, at least one the signal processing block including taps that couple to the memory circuit, and a configuring circuit operable to configure the memory circuit and the configuring circuit further having at least one tap selector line coupled to the at least one the signal processing block so that how many taps are selected to couple to the memory circuit is coordinated with the trade-off of the memory spaces in the memory circuit.

Generally and in a further form of the invention, an electronic circuit includes a signal processing circuit including first and second signal processing blocks, a memory circuit coupled to and adjustable between the first and second signal processing blocks, the memory circuit having memory spaces, and a control circuit responsive to at least one of the signal processing blocks to dynamically adjust the memory circuit between the first and second signal processing blocks.

Generally and in another further form of the invention, a power management circuit includes a signal processing circuit including first and second signal processing blocks coupled in cascade, a memory circuit coupled to and adjustable between the first and second signal processing blocks, the memory having memory spaces, the memory circuit controllable to establish a trade-off of the memory spaces between the first and second signal processing blocks, and a power control circuit operable to control the trade-off of the memory spaces of the memory circuit and to control the power used by the memory circuit.

Generally and in yet another form of the invention, a digital video receiver includes a configurable block operable to trade off Doppler performance with multi-protocol encapsulation forward error correction (MPE-FEC), and a microprocessor coupled to the configurable block.

Generally and in still another form of the invention, a digital communication apparatus includes a telecommunication signal chain having a physical layer block (PHY) operable to perform automatic retransmission request (ARQ) of packets, and the telecommunication signal chain having a media access controller (MAC) block operable to perform ARQ of packets, and an adjustable memory having memory spaces configurably allocated to the PHY ARQ block and to the MAC ARQ block.

Generally and in another yet further form of the invention, a process of manufacturing an electronic device includes providing an integrated circuit including a signal processing circuit including first and second signal processing blocks coupled in cascade, a memory circuit coupled to and adjustable between the first and second signal processing blocks and configurable to allocate spaces for the first and second signal processing blocks, and a configuring circuit for configuring the trade-off of the memory spaces of the memory circuit; and coupling the integrated circuit with a storage circuit having configuration data representing a trade-off for use by the configuring circuit.

Generally and in another still further form of the invention, a digital communication apparatus includes a telecommunication signal chain having a channel estimation block (CE) and a multi-protocol encapsulation forward error correction block (MPE-FEC); and the apparatus includes an adjustable memory circuit having memory spaces configurably allocated to the CE block and to the MPE-FEC block.

Generally and in another process form of the invention, a process is provided for use by a business to resolve conflicting requirement sets pertaining to level of Doppler performance and to number of elementary streams of information for video reception. The process includes providing a video receiver architecture; and configuring the video receiver architecture to establish different product types wherein the same architecture from product-to-product has a product-specific configuration established therein respective to the particular product to which the configuration pertains, the configuration establishing a product-specific trade-off of memory between the level of Doppler performance and the number of elementary streams of information for video reception; and selling units of at least two of the different product types to customers, whereby the conflicting requirement sets are resolved.

Generally, a further process form of the invention involves a process of operation of an electronic circuit having first and second signal processing blocks and a memory. The process includes configuring a memory circuit to represent a trade-off of the memory spaces between first and second signal processing blocks, adjusting the memory in response to the configuring to establish the trade-off of the memory spaces between the first and second signal processing blocks, and operating the signal processing blocks in accordance with the trade-off of the memory spaces.

These and other circuit, device, system, apparatus, process, and other forms of the invention are disclosed and claimed.

BRIEF DESCRIPTION OF THE DRAWINGS

FIG. 6 is a block diagram of an inventive embodiment of a telecommunications signal processing chain, and adjustable memory having three ports coupled to three blocks in the signal processing chain, and selection configuration and various stream construction operations all controlled by a microprocessor MPU, such as for use in the inventive system embodiments of FIGS. 1, 10 and 11.

FIG. 7 is a block diagram of an inventive embodiment including a Doppler-related portion of the signal processing chain of FIGS. 1, 2, 5, and 6, and inventive memory selection controls for dynamic configuration of memory according to operating conditions, such as for use in the inventive system embodiments of FIGS. 1, 10 and 11.

Corresponding numerals in different figures indicate corresponding parts except where the context indicates otherwise.

DETAILED DESCRIPTION OF EMBODIMENTS

Figure 1:
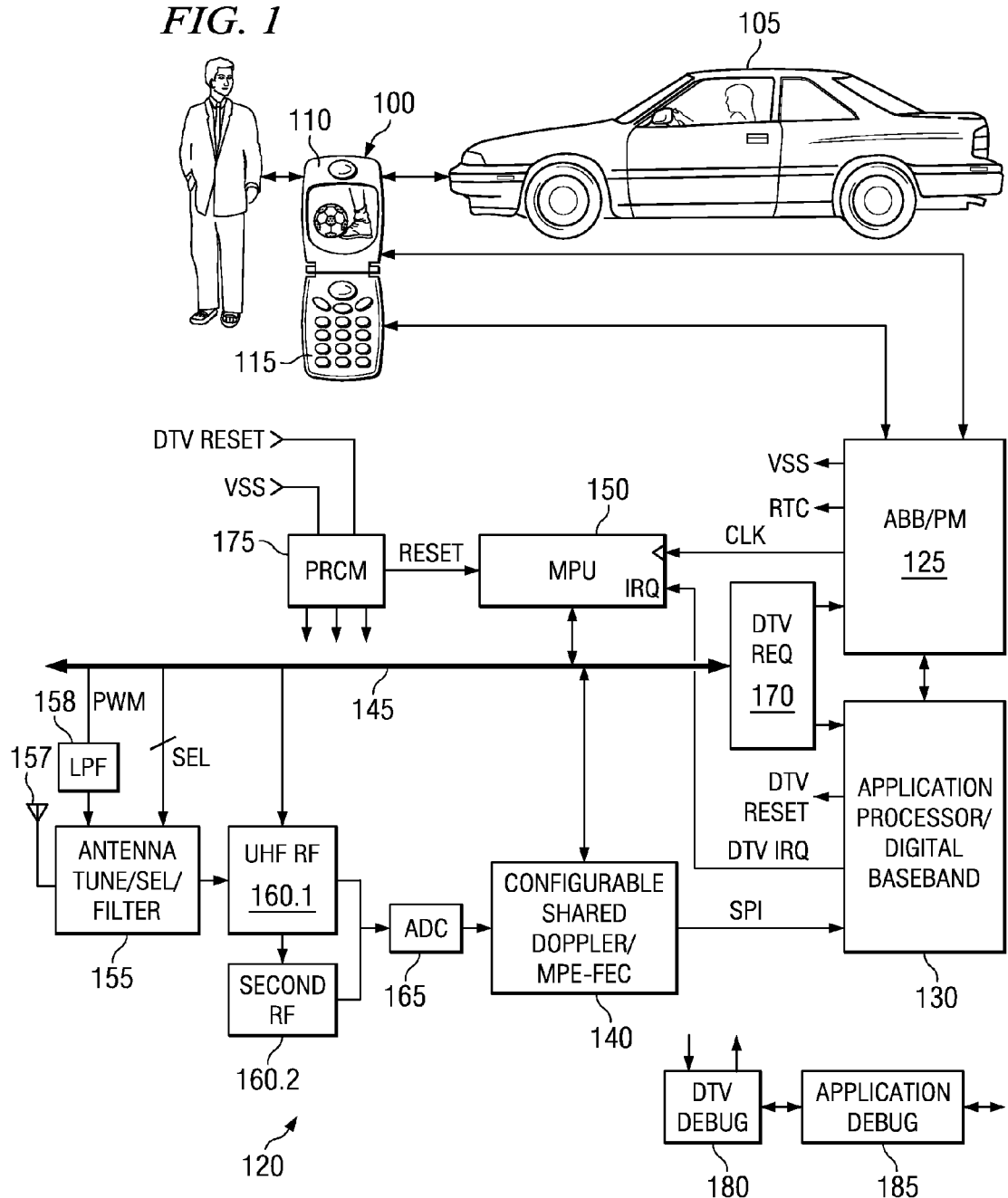
FIG. 1 is a partially-block, partially pictorial diagram of an inventive digital video receiver embodiment for use in a personal handheld device and/or a device in a vehicle which moves and is subject to Doppler signal variations.

In FIG. 1, a digital video receiver 100 is suitably constructed in accordance with multi-carrier technology such as orthogonal frequency division multiplexing (OFDM) and is compatible with any of various approaches known as DVB-H (digital video broadcasting handheld), ISDB-T (integrated service digital broadcasting terrestrial), MediaFLO™ (Qualcomm trademark) technologies and other telecommunications technologies of wireless, wireline, optical fiber, and other forms. Digital video receiver 100 is provided as a mobile handheld device and/or a device in a vehicle that moves and is subject to Doppler signal variations due to user and/or vehicle motion relative to a base station (e.g., see FIG. 11).

In FIG. 1, digital video handset 100 is provided for mobile personal use by a user on foot and for the user in a vehicle 105. The handset has circuitry and display 110 and keypad 115 elements which also are coupled to display, speakers, and other user interface elements installed in the vehicle 105 in some embodiments. Digital television block 120 supplies video to the display 110 and audio to speakers and/or headphones (see FIG. 10). An analog baseband and power management block 125 is coupled to display 110 and keypad 115, and further coupled to an application processor and digital baseband block 130. The application processor and digital baseband block 130 is coupled to receive video from digital television block 120 via a serial interface SPI.

Further in FIG. 1, digital television block 120 has a Configurable Adjustable Shared Doppler and MPE-FEC (multi-protocol encapsulation forward error correction) block 140 coupled via a bus 145 to a supervisory microprocessor MPU 150. An Antenna Tuner/Selector/Filter block 155 receives television signals from an antenna 157. MPU 150 provides control signals over bus 145 to control antenna selection SEL and provides pulse width modulated signals PWM to a low pass filter LPF 158 to provide a controllable voltage to a voltage-controlled tuning element in Antenna Tuner/Selector/Filter block 155. Block 155 supplies one or more tuned and filtered television signals to respective RF down-converter 160.1 for VHF/UHF (very-high/ultra-high frequency) TV and a second RF down-converter 160.2 for DVB-H (digital video broadcasting handheld), and/or any analogous down-converter desired for the system. The output of each RF down-converter is an analog signal that is converted to digital form by at least one analog-to-digital converter ADC 165 which feeds the configurable adjustable shared Doppler and MPE-FEC block 140.

MPU 150 is coupled via a DTV Request interface 170 to Application Processor and Digital Baseband block 130 and ABB/PM block 125 to request activation in case of a Service Information event, such as the beginning of a scheduled program. For instance, DTV block 120 is suitably kept in a low-power mode and then becomes fully activated if the DTV Request is granted by Application Processor and Digital Baseband block 130. Also, Application Processor and Digital Baseband block 130 has software that asserts active control over the DTV block 120 by supplying an interrupt request DTV_IRQ to MPU 150 and by controlling ABB/PM block 125 to provide MPU clock CLK to MPU 150, to provide real-time clock RTC to the system, and to provide supply voltage VSS via a power, reset, and control module PRCM 175 to all parts needed by DTV block 120 at any given time to provide fully-active operation. Interrupt request DTV_IRQ vectors MPU 150 to commence run-time fully-active operation of DTV block 120.

Buffering for content storage and replay later also supports time-shifting performance features to add to the user experience. When keypad 115 indicates that digital television is no longer desired, or the phone clam-shell display is closed, or upon occurrence of a time-out condition or otherwise in software, then Application Processor and Digital Baseband block 130 asserts de-activating control over the DTV block 120 by supplying a DTV Reset output to PRCM 175 to reset DTV block 120. Furthermore, a DTV Debug block 180 has a JTAG tap controller and serial scan chain coupled to various registers and circuitry of the DTV block 120 to facilitate production testing and field testing of the DTV block 120. DTV Debug block 180 is coupled to an debug block APP_DEBUG 185 associated with the rest of the system (compare Debugger of FIG. 10) for comprehensive debug of the handset 100.

Figure 2:
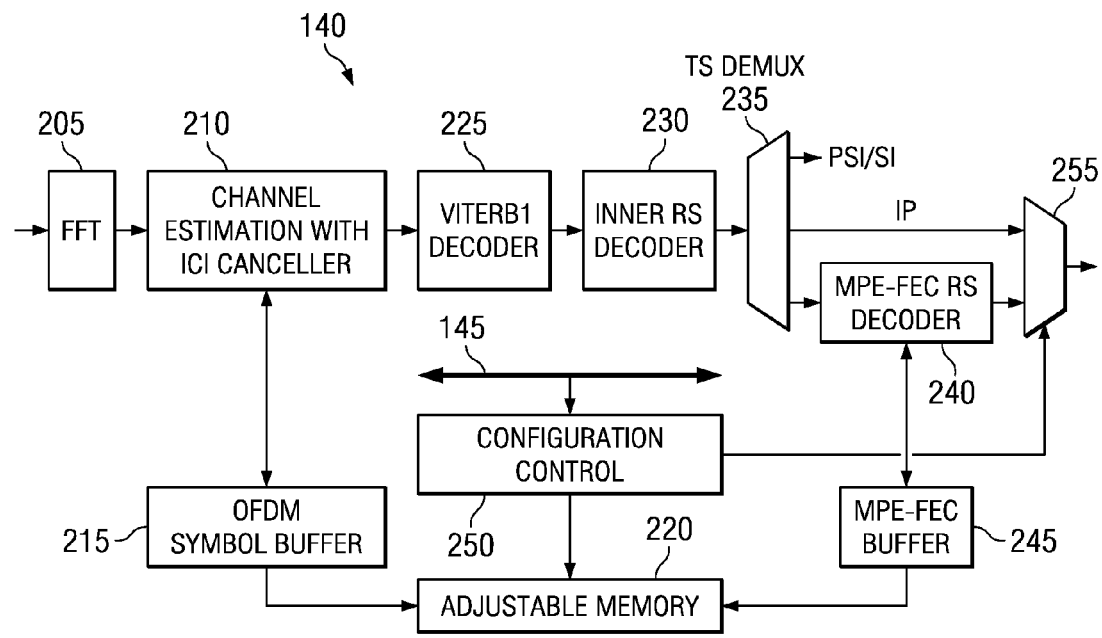
FIG. 2 is a block diagram of an inventive embodiment of a telecommunications signal processing chain, combined with an adjustable memory and configuration control, such as for use in the inventive system embodiments of FIGS. 1, 10 and 11.
Figure 10:
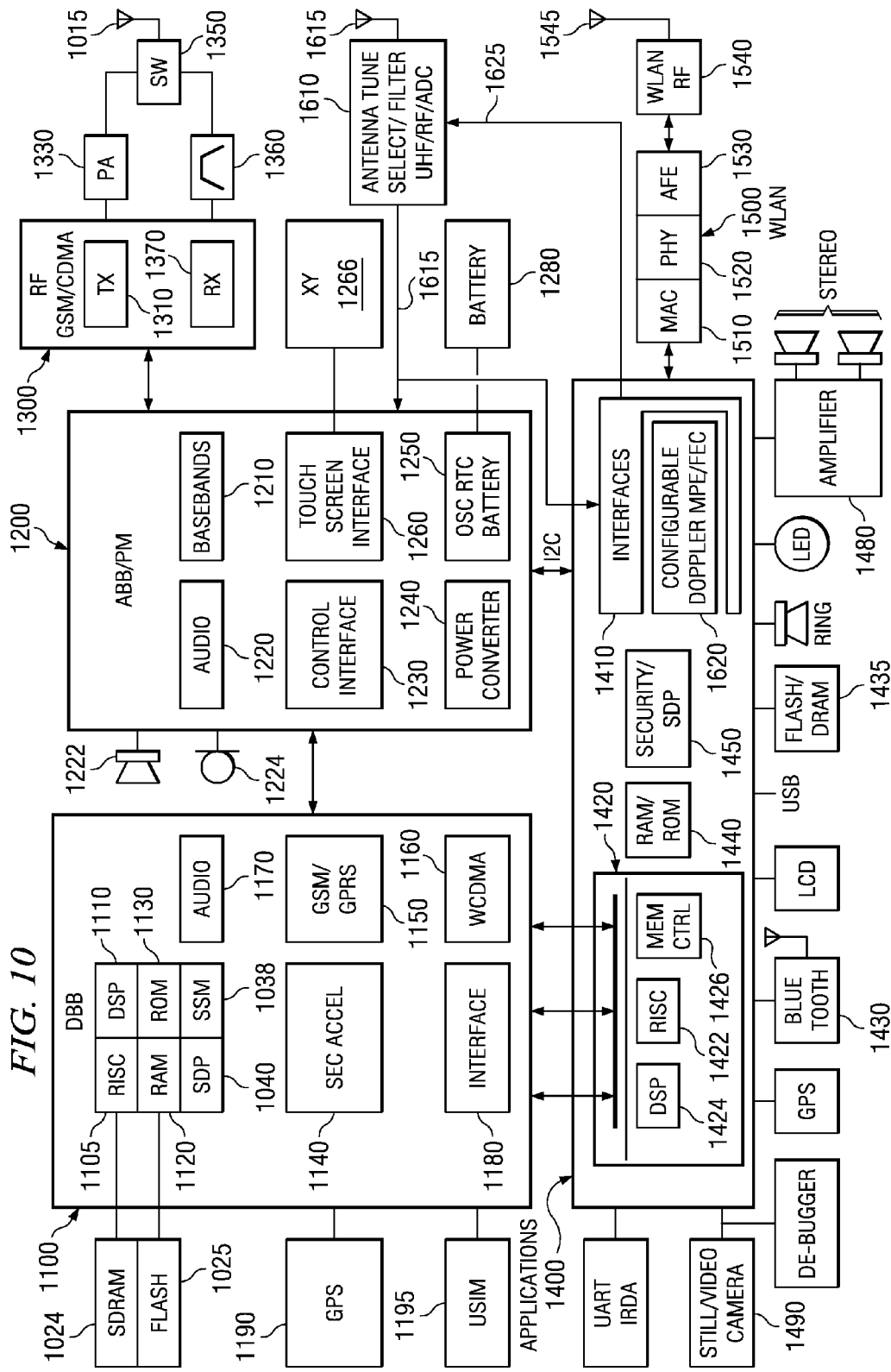
FIG. 10 is a block diagram of inventive integrated circuit chips for use in the blocks of the communications system of FIG. 11, including an inventive partitioning of the blocks of FIGS. 1-9.
Figure 11:
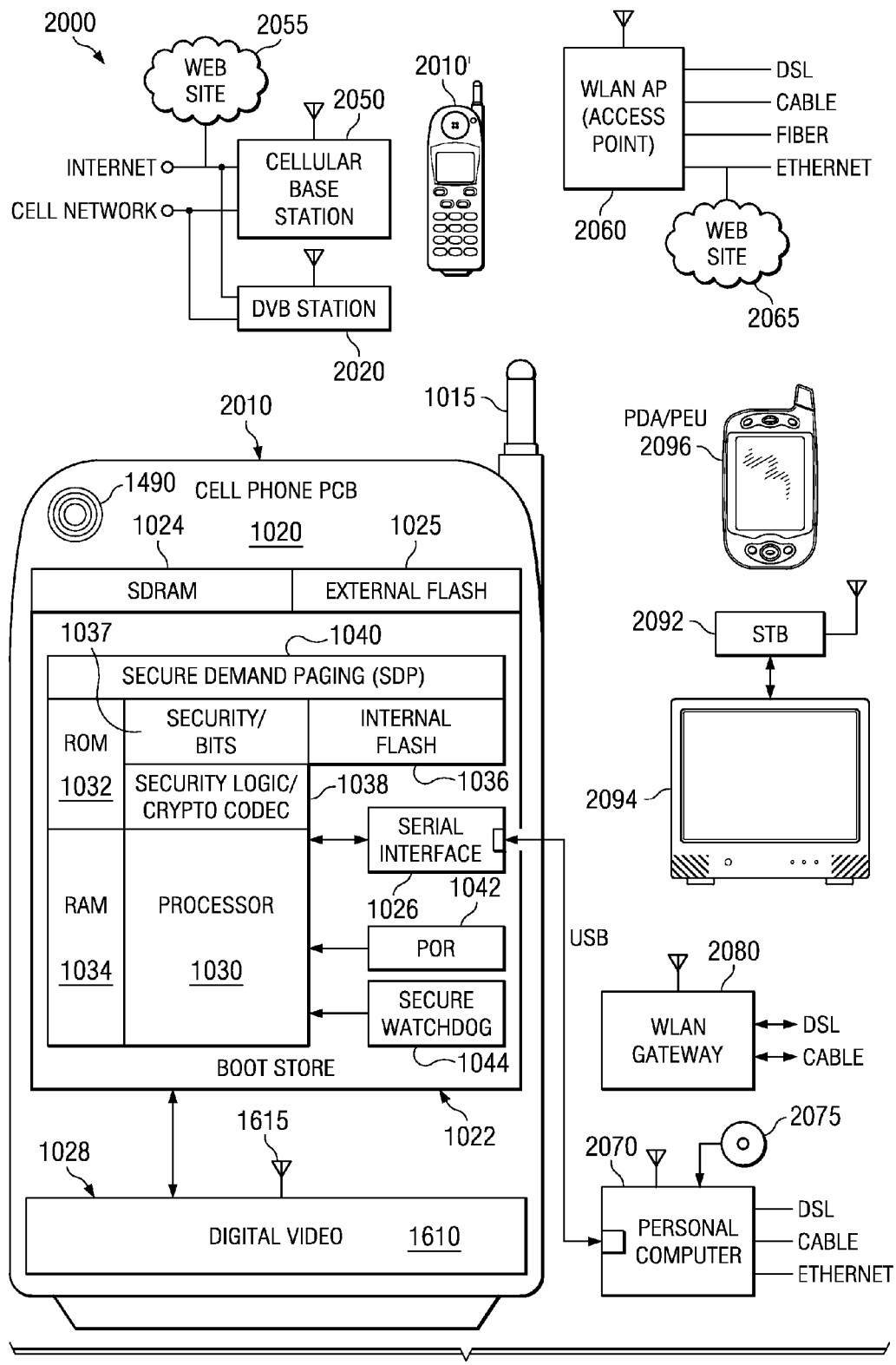
FIG. 11 is a pictorial diagram of a communications system embodiment including system blocks, for example a cellular base station, a DVB video station, a WLAN AP (wireless local area network access point), a WLAN gateway, a personal computer, a set top box and television unit, and two cellular telephone handsets, any one, some or all of the foregoing improved according to the invention.

In FIG. 2, the configurable adjustable Doppler/MPE-FEC block 140 of FIG. 1 includes a telecommunications signal processing chain having blocks 205, 210, 225, 230, 235, 240 that is combined with an adjustable memory 220 and configuration control 250, for use in the devices and systems of FIGS. 1, 10 and 11. The adjustable memory 220 and configuration control 250 support competing, memory-hungry processes pertaining to Doppler and MPE-FEC in a manner described further elsewhere herein. An FFT (Fast Fourier Transform) block 205 is coupled to a block 210 for Channel Estimation with Interchannel Interference Canceller. Block 210 is coupled by OFDM symbol buffer 215 to or in the adjustable memory 220. Block 210 feeds a Viterbi Decoder 225, which in turn feeds decoded output to an Inner RS (Reed Solomon) Decoder 230. Block 230 feeds a transport stream demultiplexer TS Demux 235.

TS Demux 235 provides PSI/SI (program specific information/service information) streams and IP (Internet protocol) datagrams of a less-fully-corrected nature. An MPE-FEC RS (Reed-Solomon) Decoder block 240 provides multi-protocol encapsulation forward error correction to supply more-fully-corrected IP datagrams than those from TS Demux 235. MPE-FEC block 240 is coupled to a MPE-FEC Buffer 245 to or in the adjustable memory 220.

A Mux 255 has first input to receive the more-fully-corrected IP datagrams from MPE-FEC RS (Reed-Solomon) Decoder block 240. This Mux 255 has a second input fed by the less-fully-corrected IP datagrams from TS Demux 235. Mux 255 selection is controlled by a selector control from Configuration Control block 250. Depending on the level of correction configured in Configuration Control block 250, the Mux 255 supplies an output SPI (FIG. 1) of IP datagrams from TS Demux 235 or MPE-FEC RS Decoder 240. Power management is also suitably applied by PRCM 175 of FIG. 1 in response to the selector control from Configuration Control block 250 to Mux 255.

In this FIG. 2 embodiment, DVB-H signals are constructed and transmitted using the principles of orthogonal frequency division multiplexing (OFDM). OFDM operates by pulsing a carrier and putting modulation or symbols on the pulses, so that in the frequency domain the pulses amount to a plurality of subcarriers called tones spaced around the main carrier. Each of the multiple subcarriers as transmitted according to OFDM inherently carry the same symbols (until transmission noise and other effects introduce errors), and this signal redundancy promotes information transmission reliability and facilitates error correction at the receiver 100. The DVB-H signal is received and down-converted by an RF tuner 160.1 of FIG. 1. Complex, digital baseband samples of the down-converted signal are output from the ADC 165 to a fast Fourier transform processor or block 205 of FIG. 2, which converts the time domain data samples into frequency domain OFDM symbols.

Channel estimation block 210 compensates for multi-path effects, fading, and other distortions that appear in the transmission channel. The signal as transmitted is altered by a transfer function H of the transmission channel. The channel estimation algorithm makes a statistical estimate H-hat of that transfer function when predetermined symbols known at each end are sent as pilot symbols on some of the tones (over-the-air carrier frequencies) called pilot tones during an occasional pilot transmission period. The process then at least partially cancels the transfer function H by multiplying H by the inverse of the estimated transfer function H-hat.

In the mobile handset or vehicular mobile device 100, motion of the entire handset or device relative to a television transmitter introduces a potentially interfering effect called Doppler effect on the transmission channel as seen at the receiver 100. For example, the user when walking, taking an escalator or elevator, or driving a car moves the handset relative to the television transmitter. (An analogous acoustic Doppler effect is commonly heard by a listener as the pitch of a whistling moving train or ambulance siren changes as an effect of its motion relative to the listener.) The Doppler effect of the motion of the receiver 100 relative to the transmitter smears the reception by moving, displacing or offsetting the tones and their modulation in the frequency domain at channel estimation time compared to their frequency placement in the originating transmission.

Doppler circuitry in block 210 supplies a Doppler estimate representing frequency displacement or difference in units such as number of Hertz. The Doppler estimate responds to and essentially looks like a frequency shift between the time-bases (clocks) of the transmitter and receiver. To estimate the Doppler frequency, an auto-correlation process is applied, for example, to known data received in one OFDM symbol auto-correlated with the next symbol.

According to an applicable video transmission protocol, pilot symbols are sent from a television transmitter and buffered (e.g., 3-4 at a time) in the receiver to estimate the magnitude of Doppler effect. Then television information is transmitted at TV frequency modulated with IP datagrams from the television transmitter to the handset 100. Handset 100 receives the IP datagrams representing the television program transmission. Then the television transmitter delivers another pilot transmission period in response to which the receiver block 210 adaptively further adjusts for the Doppler effect using feedback based on the estimated Doppler frequency, and then yet-further information is successively transmitted, and so on.

Intercarrier interference (ICI) cancellation in block 210 further improves performance of the channel estimation algorithm. The channel compensated OFDM symbols are then sent to a convolutional decoder Viterbi decoder 225, which is a first-layer in a forward error correction (FEC) process to improve the probability of error-free reception of the transmitted signal, such as by detecting and eliminating errors in the received signal.

The decoded bits are then grouped in blocks of bytes (e.g., 204-byte blocks) and sent to a second-layer of FEC, the inner Reed-Solomon (RS) decoder 230. At the output of the inner RS decoder 230, groups of packets (e.g., 188-byte packets) conforming to the MPEG-2 transport stream (TS) packet format are sent to the TS demultiplexer 235. TS demultiplexer 235 filters the multiplexed MPEG-2 transport stream TS to obtain the broadcast content within the broadcast digital video signal. To prepare for and provide for a third-layer of FEC, some of the video content is previously further protected with an outer RS coding step prior to transmission. This outer layer is known as the multi-protocol encapsulation forward-error correction, or MPE-FEC. Decoding of this layer is performed by MPE-FEC RS Decoder 240. The TS demultiplexer 235 has output for IP datagrams without MPE-FEC as well as PSI/SI (program specific information and service information).

Two performance properties or parameters pertaining to a digital video receiver system 120 of FIG. 1 and signal chain 140 of FIG. 2 are (1) the maximum Doppler frequency due to receiver motion that the receiver system 120 will tolerate while still providing relatively error-free reception, and (2) the maximum number of elementary streams containing MPE-FEC that the receiver system 120 can decode concurrently due to different types of video transmission and channel transfer function characteristics and capacity of receiver system 120. Both performance properties (1) and (2) are enabled and enhanced by adding memory to the receiver. Memory is limited by considerations of cost, space and power. Accordingly, a tradeoff is made herein between the competing parameters by an intelligent process of static and/or dynamic configuration of an adjustable memory 220. Various embodiments address this problem to efficiently support practical use-cases with limited memory, thereby minimizing the overall system cost in FIGS. 1 and 2 of DTV block 120 and handset 100 itself.

In an OFDM receiver, Doppler performance can be improved through a process in block 210 that iteratively cancels the intercarrier interference within an OFDM symbol. However, additional memory is used for each iteration of the process in block 210, as more of the OFDM symbols are buffered, see OFDM Symbol Buffer 215 and adjustable shared memory 220, and later discussion herein for FIGS. 8-9. In one example, the buffer space used is on the order of 0.5 Mbit per iteration or processing stage.

A competing process block MPE-FEC 240 in an example uses between 0.5 Mbit and 2 Mbit of storage in MPE-FEC Buffer 245 to support processing of each elementary stream. Adjustable memory 220 provides a limited, configurable space responsive in size to Configuration Control 250 that combines the spaces of OFDM Symbol Buffer 215 and MPE-FEC Buffer 245. Some embodiments also leave some guaranteed, or unshared, space reserved for and represented by one or both of FIG. 2 blocks shown explicitly as OFDM Symbol Buffer 215 and MPE-FEC Buffer 245.

In FIGS. 1-2, among other digital video embodiments, there are roughly four regimes or categories of embodiments. A first regime provides lower Doppler performance with support for fewer concurrent MPE-FEC elementary streams. A second regime provides higher Doppler performance with support for fewer concurrent MPE-FEC elementary streams. A third regime provides lower Doppler performance with support for a higher number of concurrent MPE-FEC elementary streams. A fourth regime provides higher Doppler performance with support for a higher number of concurrent MPE-FEC elementary streams.

Thus, four cases are:
Low Doppler, Low Elementary Streams
Low Doppler, High Elementary Streams
High Doppler, Low Elementary Streams
High Doppler, High Elementary Streams In some embodiments, cases 1, 2, 3 are handled by different respective configurations and memory real-estate is saved. Power management is suitably applied in case 1 in some embodiments wherein less memory is likely to be actively used than in cases 2 and 3. In some other configurable embodiments, memory real-estate may be higher to handle all four cases including highest performance in case 4. Power management is applied in some embodiments to save power in the lower performance cases 2 and 3, and to conserve even more power in case 1.

An elementary stream is a stream of packets in the transport stream that share a common packet identifier (PID). Note that multiple streams of packets for different content streams, such as different TV programs, or e-mails and audio and video can be delivered concurrently in the transport stream and stored in the system in a manner respectively identifying the different streams, services, and applications.

Figure 4:
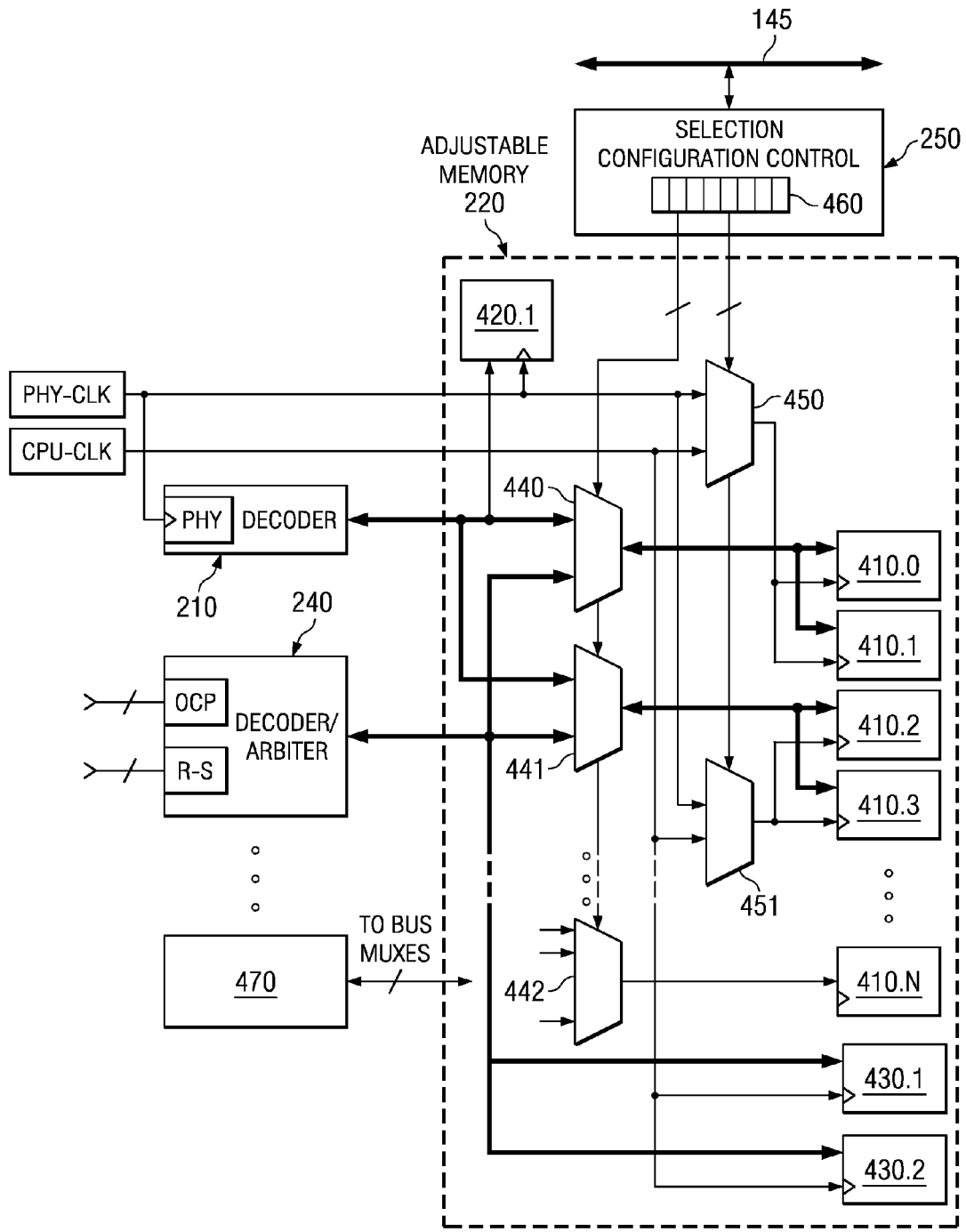
FIG. 4 is partially-schematic, partially block diagram of an inventive embodiment of adjustable memory circuitry with the selection configuration control, such as for use in the inventive embodiments of FIGS. 1-11.

In FIGS. 2 and 4, both a Doppler process in block 210 and an MPE-FEC process in block 240 share the same adjustable memory 220. Thus, for a fixed memory size of adjustable memory 220, the embodiment supports solutions across or within the range of plural regimes.

Various customers may have differing and conflicting requirement sets to specify the presence, number, and level of performance of the Doppler interference canceling process and multiple MPE-FEC elementary streams. Some embodiments accommodate such requirement sets by providing a digital video receiver embodiment of a single architecture that is statically configured in different ways that accommodate the conflicting requirements by trading off memory between the Doppler interference canceling and number of MPE-FEC elementary streams. The architecture of a same particular embodiment gets the work done that is specified by a given requirement set for one application or customer, and is reconfigurable for another application or customer without architectural revision to get the work done that is specified by that other application or customer. Thus, the same architecture executes work that is different work for different requirement sets.

Without added memory cost to the system, some digital video receiver embodiments are configured to support either high Doppler performance or the concurrent reception of multiple MPE-FEC elementary streams or some other tradeoff between Doppler and multiple MPE-FEC elementary streams. In other words, both of these desirable features can be enabled within the same product, whether or not at the same time, at a lower overall system cost than a solution that independently provides both the highest Doppler performance and the concurrent reception of highest number of multiple MPE-FEC elementary streams. A digital video receiver using an embodiment can appeal to a broader base of customers, thereby delivering a wider range of choices to enterprises and to the consuming public.

Dynamically trading off Doppler performance with multiple concurrent performance of MPE-FEC streams has two features. One way allows a company to dynamically support and sell to a customer base using an embodiment that supports various requirement sets by statically configuring a configuration selection block to satisfy the various requirement sets. Software programs registers to fix the selectors.

In some embodiments, circuitry dynamically trades off Doppler performance of a moving or non-moving platform at different times, see FIG. 7 discussion elsewhere herein. Over a short period of time, the wireless path from the transmitter to the receiver 100 is about the same, but the velocity of the receiver 100 relative to the transmitter introduces Doppler effect. In channel estimation block 210, and with low Doppler, an equalizer process may require only a few taps and a correspondingly relatively-small amount of memory. At high Doppler to handle the circumstance of a fast moving receiver when the carrier frequency is moving fast, a more complex, advanced or more-extensive equalizer process uses more taps and a larger amount of memory to compensate or cancel the Doppler effect. See FIGS. 8-9 described later hereinbelow.

Figure 3A:
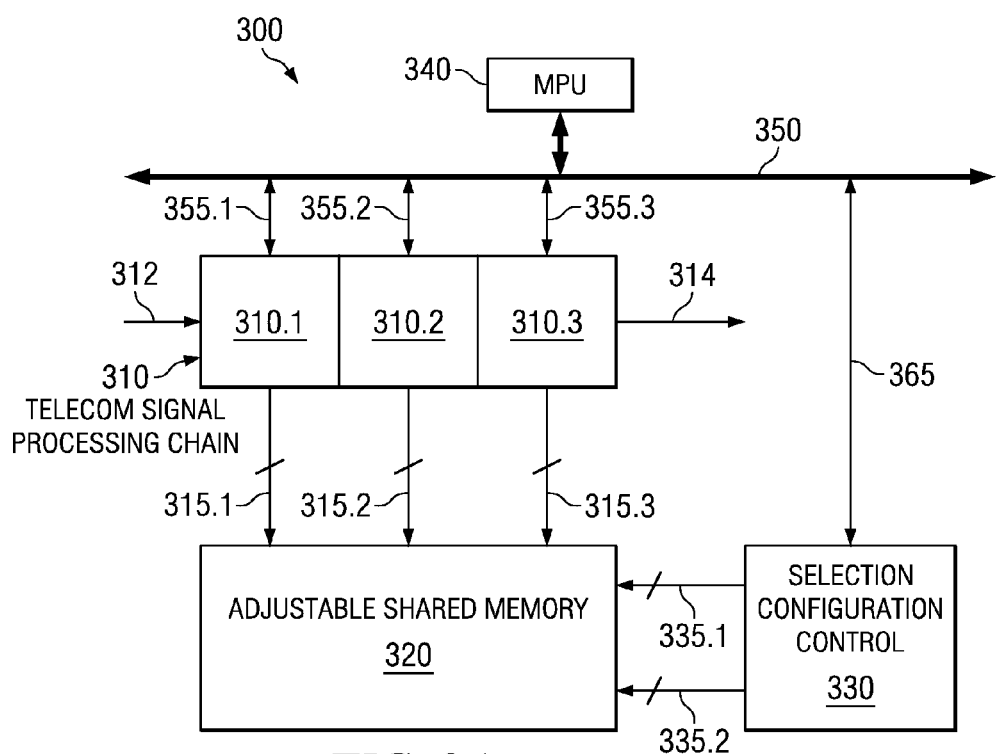
FIG. 3A is a block diagram of an inventive embodiment of a telecommunications signal processing chain, combined with an adjustable memory and selection configuration control supervised by a microprocessor MPU, such as for use in the inventive system embodiments of FIGS. 1, 10 and 11.

Turning to FIG. 3A, a telecommunications terminal or client has a multi-stage telecommunications signal processing chain 310 is combined with an Adjustable Memory 320 and a Selection Configuration Control 330 supervised by a microprocessor MPU 340 over a bus 350. The telecommunications signal processing chain 310 has an input 312 and an output 314, and has stages 310.1, 310.2, 310.3, etc. that are respectively coupled to the adjustable memory 320. The Selection Configuration Control 330 statically and/or dynamically provides datapath selector controls 335.1 and clock selector controls 335.2 to selectors associated with the Adjustable Memory 320 to statically accommodate needs of a given embodiment to meet performance, power and cost targets and even to dynamically optimize the performance. Bus 350, such as an OCP (Open Core Protocol) bus is coupled to receive performance-monitoring and handshake information from, and to supply configuration, control, and supervisory information via bus lines 355.1, 355.2, 355.3, etc. to, registers in each corresponding stage 310.i of telecommunications signal processing chain 310. Also, Bus 350 conveys configuration, control, and supervisory information from MPU 340 via bus lines 365 to Selection Configuration Control 330.

In FIG. 3A, the telecom signal chain 310 has sub-blocks 310.i with memory requirements that are statically traded off to satisfy different requirement sets of applications or customers. In some embodiments the memory requirements are dynamically traded off. In other words, the memory allocations are dynamically varied according to operating conditions of a given embodiment. Examples of applications and telecommunication signal chains include DVB-H, DVB-T and other DVB prefixed technologies, T-DMB (terrestrial digital multimedia broadcasting), ISDB (integrated services digital broadcasting, WiMax PHY/MAC ARQ, and other wireless, wireline, optical fiber, etc., applications. (PHY means physical layer. MAC means media access control layer.) In some embodiments the access ports, muxes, and memories are on the same integrated circuit chip, and in other embodiments the circuitry is partitioned between multiple chips. In some embodiments, clock muxes, bus muxes and memory spaces per FIG. 4 are partitioned to a separate integrated circuit and manufactured as a memory chip product.

In FIG. 3A, telecommunication signal processing chain 310 has blocks wherein the memory 320 is, in some embodiments, allocated between the blocks in the sense that the memory is not a buffer between blocks but an adjustable storage that has spaces allocated to meet competing independent demands of blocks that the memory itself does not couple together. In FIGS. 1 and 2, the telecommunications signal chain is instantiated as a digital video signal chain wherein the adjustable memory 320 is allocated to the Doppler/ICI block and also allocated to the independent function of the MPE-FEC.

In FIG. 3A, a telecommunication signal chain 310 is alternatively instantiated as a signal chain having a WiMax PHY ARQ block and MAC ARQ block for automatic retransmission or repeat request of packets. The adjustable shared memory 320 is allocated to and between the PHY ARQ block and to the MAC ARQ block, which are operatively independent of each other at least to some extent. WiMax and other telecommunications systems are improved as taught herein to suitably allocate between PHY and MAC adjustable memory as taught herein. Suppose a cell phone with WiMax signal chain has 0.5 Mbps or 1Mbps bandwidth categories, and then transitions to 5 Mbps. At the higher 5Mbps bandwidth, a larger ARQ buffer is needed. Thus, in the improved WiMax system, PHY and MAC are allocated shares in the space of an adjustable memory.

In an embodiment of FIG. 3A, a WiMax PHY layer has an ARQ (automatic repeat request) module and MAC (media access control) layer has another ARQ chip for MAC ARQ. Physically, the ARQ looks at the bandwidth categorization specified by a bandwidth or rate category 1, 2, 3 or 4. Depending on the category of bandwidth to be supported, a different amount of memory is needed. The terminal 300 is arranged to communicate to a base station to specify what rate category the terminal wants. The terminal can call for the base station to recognize that the terminal has a particular or certain rate capacity or capability. Then the terminal PHY memory buffer is allocated a corresponding amount of space for that particular rate capacity. Given a particular rate in the PHY, the MAC ARQ buffer can independently set an amount of space it needs. The terminal trades off between PHY ARQ memory and MAC ARQ memory because when one of PHY or MAC uses an increased amount of space, the other one (MAC or PHY) does not need as much memory space because of the roles of their communications functions.

Figure 3B:
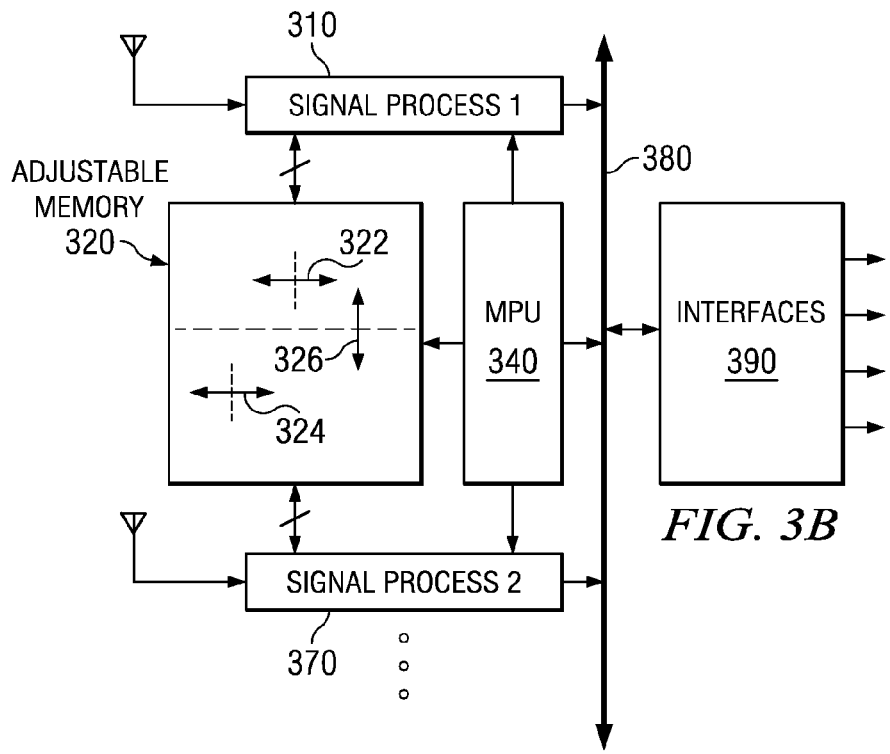
FIG. 3B is a block diagram of another inventive embodiment of a telecommunications signal processing chain, combined with an adjustable memory and selection configuration control supervised by a microprocessor MPU, such as for use in the inventive system embodiments of FIGS. 1, 10 and 11.

In another embodiment shown in FIG. 3B, a first Signal Process_1 310 has multiple blocks or stages, and a second Signal Process_2 370 has multiple blocks or stages. A supervisory processor MPU 340 trades off an adjustable memory 320 according to allocations 322 between stages of Signal Process_1 and allocations 324 between stages of Signal Process_2. Further, the MPU 340 trades off adjustable memory 320 according to a super-allocation 326 between memory space provided for Signal Process_1 and memory space provided for Signal Process_2. Thus, allocation 322 is a percentage allocation to Signal Process_1 stages within the memory space super-allocated for Signal Process_1. Allocation 324 is a percentage allocation to Signal Process_2 stages within the memory space super-allocated for Signal Process_2.

MPU 340 configures and controls the blocks 310, 320, 370 directly in some embodiments or through a Selection Configuration Control 330 as in FIG. 3A in other embodiments. In a numerical example, suppose the super-allocation of the adjustable memory is 60% to a first signal processing chain and 40% to a second signal processing chain 2. Continuing the numerical example, the adjustable memory is illustratively allocated 40% (=67%×60%) and 20% (=33%×60%) to first and second blocks in the first signal processing chain. The adjustable memory is illustratively allocated 20% (=50%×40%) and 20% (=50%×40%) to first and second blocks in the second signal processing chain. The various percentages are adjustable.

In still another embodiment, super-allocation is provided for power management purposes to run a dynamically-configurable part of the memory in a low-power or off mode and another part of the memory in a full power mode. Allocation of full power mode memory space between at least two signal process blocks is provided for the part of the memory that is running in the full power mode. For example, if Doppler is low or negligible, and number of elementary streams is low, then part of the memory can be allocated to power management power-down space to conserve power until Doppler rises or a service event to increase the number of elementary streams occurs.

Further other embodiments do a three-way super-allocation between Signal Process_1 memory space, Signal Process_2 memory space, and power management power-down memory space. Signal Process_1 memory space is in turn allocated to plural blocks of Signal Process_1. Signal Process_2 memory space is in turn allocated to plural blocks of Signal Process_2.

An example of an embodiment of FIG. 3B has an OFDM receiver as Signal Process_1 310 and a GPS core or chip as Signal Process_2. Another example has an OFDM receiver as Signal Process_1 310 and a WiMax process as Signal Process_2. Another example has a GPS core or chip as Signal Process_1 310 and a WiMax process as Signal Process_2. Still other signal processes and signal chains are applied either in place of block 370 or as further parallel blocks 370.$i$ as indicated by ellipsis in FIG. 3B.

Another example of an adjustable memory embodiment in FIG. 3B has MPU 340 establish mutually exclusive memory ranges (e.g., base address and size) for each signal processing block in the first and second signal processing chains 310 and 370. The address ranges are entered and adjusted by MPU 340 in configuration registers associated with a plural-port memory array in memory 320. MPU 340 also sends control signals on control lines 344 and 348 to chains 310 and 370 to enable and disable taps or other signal processing circuits so that adjustable numbers of them are activated therein and so that the configured-available amounts of memory are used and not exceeded by operation of each applicable block in each of the signal processing chains 310 and 370.

In FIG. 4, adjustable memory circuitry 220 is coupled with the selection configuration control 250, such as for use in the circuits of FIGS. 1-11. In FIG. 4, an embodiment of a RAM block provides a 3-Mbit RAM split to allow combinations of (a) 1 Mbit for MPE-FEC and 2 Mbit for channel estimation, (b) 2 Mbit for MPE-FEC and 1 Mbit for channel estimation, and (c) 3 Mbit for MPE-FEC and 0 for channel estimation. The example also shows that the individual memory blocks are traded-off between different clock domains. Multiplexed control accommodates embodiments with parallel data paths and embodiments with serial data paths to a set of memory banks.

Examples of the services and programs that can be received and that have known amount memory needed for such service are audio, video, or data. Simultaneously broadcast along with these services are service information (SI) tables, such as an ESG (electronic service guide). A receiver can know how much memory is needed for each service from processing of that information.

The amount of available or allocated memory limits or restricts the extent to which the telecommunications signal processing blocks can function. Channel estimation, for instance, does not fail when memory is limited because estimates of the received data, x, can be taken from the equalizer output of any iteration. All the equalizer outputs are valid; however, estimates improve as more iterations (memory buffers) are allocated.

In an example of a digital video mode, an on-chip memory is used for MPE-FEC, and an additional 1Mb/0.5Mb (for 4/3 iterations) of the data-tones memory of the Doppler algorithm is used by the MPE-FEC. In T-DMB mode, 2Mb are used by the time-deinterleaver of the FEC module. DVB-H and T-DMB are examples of a transport layer. Internet protocol IP carries encapsulated video content in IP datagrams.

For the MPE-FEC decoder 240 of FIG. 2, a system controller, such as microprocessor 150, supervises and controls the system 120 so that the limited memory 220 is adequate for the system to operate. The system controller maintains a record of the amount of memory space in FIG. 4 currently assigned to MPE-FEC 240. Each available service/program that can be received utilizes a predetermined, fixed amount of memory for MPE-FEC. The system controller also maintains a record of the predetermined memory space amount that pertains to each given service and program which can be presented to the system. Then as particular services and/or programs are actually received or terminated, the record of the amount of available memory space for MPE-FEC is correspondingly increased or decreased by the predetermined memory space amount that pertains to the given service or program for which a status change occurs. A minimum amount of memory is reserved so that a desired number of services can be concurrently supported.

If a request for an additional service is received, and if the memory needed for that service exceeds the memory available in allocable spaces 410.0-410.N, then that request is rejected by the system controller and a message is sent to a host processor such as the applications processor of block 130 in FIG. 1.

In FIG. 4, an adjustable memory embodiment configurably multiplexes clocks PHY_CLK and CPU_CLK and multiplexes buses for address and data to memory segments 410.0-410.3. Different proportions of total memory space are thus allocated to different functions in the telecommunications signal processing chain 140 of FIG. 2 or 310 of FIGS. 3A and 3B. The configuration control 250 supplies selector controls to the various bus multiplexers 440, 441, 442, etc., and clock multiplexers 450, 451, etc., to allocate the memory space 410.i collectively. Also some guaranteed, reserved or minimum memory space 420.1 for the channel estimation function 210 and analogous guaranteed space 430.1, 430.2 for MPE-FEC function 240 are provided. The guaranteed space is reserved by direct coupling of access ports and clocks from different functions (e.g., 210, 240) in the telecommunications signal chain to various portions of the memory space in combination with the configurable, contingent or allocable multiplexed memory space 410.0-410.3.

Further embodiments provide structures with any plurality of access ports (e.g., 470) and any plurality of clocks by adding further selector control lines from the configuration block 250 to the multiplexers 440 etc. and 450 etc. Inputs are provided to the multiplexers 440 etc. from any two or more or all of the plurality of access ports and inputs to the multiplexers 450 etc. from any two or more or all of the plurality of clocks. Some embodiments provide plural-ported memory 220 for read/write access from different busses to respective memory ports, wherein configuration register(s) 460 configurably allocate memory spaces in the plural-ported memory 220 for use by multiple corresponding signal processing blocks 210, 240, 470. Some embodiments use a digital signal processor core or integrated circuit to implement two or more of the signal processing blocks 205, 210, 225, 230, 235, 240, 255 of FIG. 2 for instance. The digital signal processor core or integrated circuit is arranged to have configuration registers to define address spaces and additionally have multiple busses to access the plural-ported memory.

In FIG. 4, a static selector block has register bits 460 or a non-volatile store that is coupled or decoded to selector controls of the muxes of FIG. 4. In some embodiments, MPE-FEC 240 has guaranteed space and configurable space and Channel Estimation has some guaranteed space and configurable space. Some embodiments, depending on the intended application add more mux selections per mux for more than the two access ports, and/or for more clocks.

In another embodiment, memory is shared between different video standards so that for DVB-H, the memory is allocated as taught herein and for TDMB (terrestrial digital multimedia broadcasting or T-DMB) standard the memory is used for time-to-deliver. Also, for improved TDMB, adjustable shared memory as taught herein is used to allocate memory or trade off memory for Doppler and time-to-deliver.

In FIG. 4 and FIG. 2, Selection Configuration Control block 250 is coupled to bus 145 and to Adjustable Memory 220. Memory 220 has four 512K blocks of memory 410.0, 410.1, 410.2, 410.3. Blocks 410.0 and 410.1 are coupled to the output of a bus Mux 440. Blocks 410.2 and 410.3 are coupled to the output of a bus mux 441. Block 210 has an access port PHY/decoder for the Channel Estimation process coupled both to a first input of the Mux 440 and to a first input of the Mux 441. In some embodiments, one or more blocks such as 420.1 to establish a guaranteed minimum memory space are coupled to the Channel Estimation block 210 of FIGS. 2, 8 and 9.

In FIG. 4, MPE-FEC block 240 has an access module coupled both to a second input of the Mux 440 and to a second input of the Mux 441. The access module of block 240 has a decoder arbiter circuit with inputs for access either from the OCP bus 145 or from the RS (Reed-Solomon) process of MPE-FEC RS Decoder 240 of FIG. 2. In some embodiments, one or more blocks 430.1, 430.2 are provided to establish a guaranteed minimum addressable memory space are coupled to the block 240 as well. In this example, Blocks 430.i provide a 1-Mbit reserved space accessible by the MPE-FEC process.

In FIG. 4, the bus Muxes 440 and 441 have selector controls coupled to register bits of register 460 in Selection Configuration Control 250, such as for independently establishing selections by each Mux 440 and 441. The blocks 410.0-410.3 provide a 2-Mbit adjustable, shared memory space accessible by either the Channel Estimation process or by the MPE-FEC process, depending on the state of the register bits in register 460 of Selection Configuration Control 250.

A clock designated PHY_CLK is coupled to a first input of a clock Mux 450 and to a first input of a clock Mux 451 and to a clock input of memory block 420.1. An additional clock designated CPU_CLK is coupled to a second input of clock Mux 450 and to a second input of clock Mux 451 and to clock inputs of memory blocks 430.1 and 430.2. The output of clock Mux 450 is coupled to clock inputs of memory blocks 410.0 and 410.1. The output of clock Mux 451 is coupled to clock inputs of memory blocks 410.2 and 410.3. Clock Muxes 450 and 451 have respective selector controls coupled to register bits in register 460 of Selection Configuration Control 250. Using clock muxes 450, 451 separate from bus muxes 440, 441, etc., facilitates clock rate throttling of processes, power management, and memory control.

Still other embodiments based on FIG. 4 provide sufficient numbers of additional bus muxes 442, 443, and so on, to allocate memory space for more stages such as 470 in a given signal process of FIGS. 3A, 6 and 7 or perform super-allocation between signal processes as in FIG. 3B. The bus muxes 440, etc., are suitably provided as if diagrammatically in a single column as in FIG. 4 in some embodiments. Other embodiments provide the muxes in hierarchical tree shaped interconnected circuitry, such as sources to two muxes to four muxes to memories. Also, additional clock muxes 452, 453, and so on are provided in embodiments that have further clock sources. The circuitry of FIG. 4 is replicated to serve multiple adjustable memories as in FIG. 5. The circuitry of FIG. 4 is minimized or optimized based on considerations of real-estate expense, power dissipation, time-critical paths, and any other pertinent considerations.

In a parallel-bus version of the adjustable memory, the bus muxing is performed on plural parallel lines of parallel busses coupled to the independent telecommunication blocks, for which memory is allocated. The parallel output of each bus mux is used to access the memory block(s) to which that bus mux is coupled. For instance, a parallel bus in FIG. 4 suitably has address lines, input data lines D[:], output data lines Q[:], bus enable lines, lines for read/write controls R/nW, and a chip select line nCS.

In a serial-bus version of the adjustable memory, the independent telecommunication blocks, for which memory is allocated, are coupled via respective high-speed serial buses to the corresponding inputs of the bus muxes 440, 441, and so on. Then the serial output of each bus mux is converted from serial to parallel form and used to access the memory block(s) to which that bus mux 440 or 441, etc., is coupled.

Coupling to the muxes 440, 441, etc., and 450, 451, etc., is suitably provided by electrical conduction, optical transmission, or other coupling technology in integrated circuits.

Figure 5:
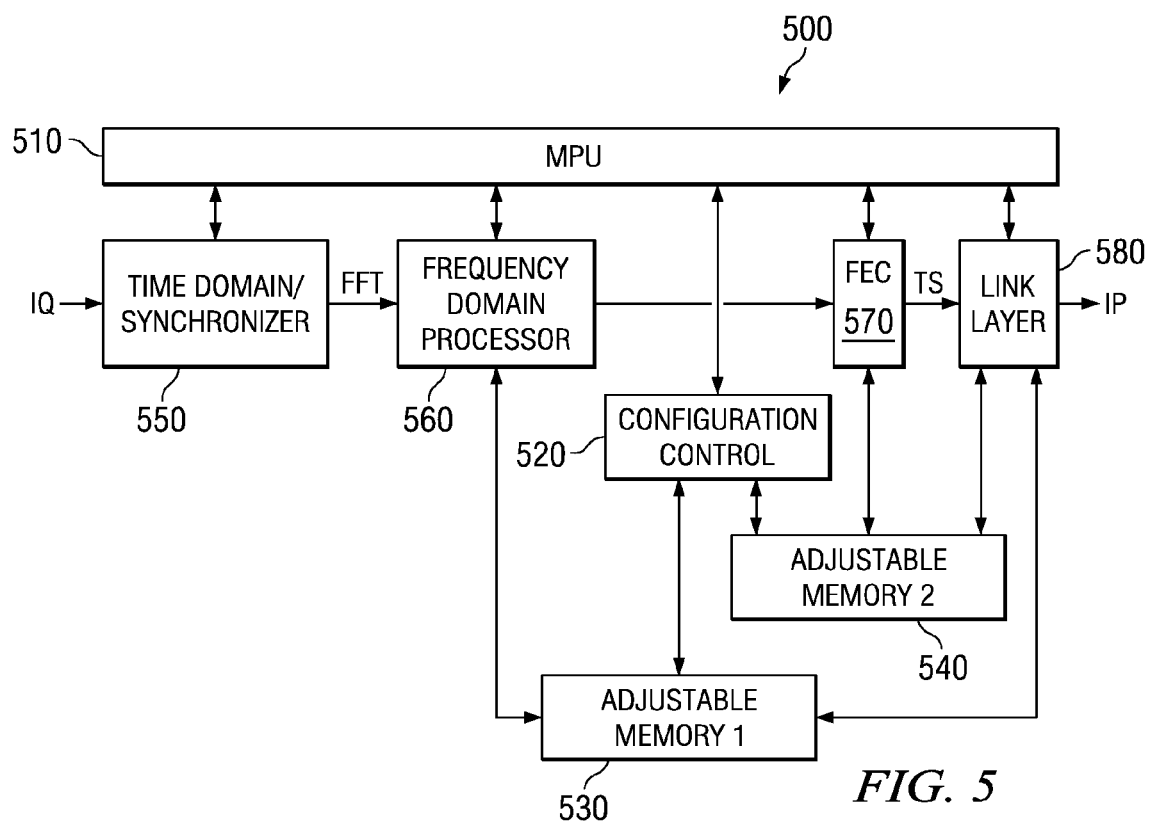
FIG. 5 is a block diagram of an inventive embodiment of a telecommunications signal processing chain, combined with two configurable, adjustable memories and selection configuration controls supervised by a microprocessor MPU, such as for use in the inventive system embodiments of FIGS. 1, 10 and 11.

In FIG. 5, a system 500 has a telecommunications signal processing chain combined with two configurable, adjustable memories 530 and 540 and a Selection Configuration Control 520 supervised by a microprocessor MPU 510, such as a RISC or other processor core. The digital telecommunication processing chain has a Time Domain and Synchronization block 550 with input IQ, a Frequency Domain Processing block 560 with input FFT, a first Forward Error Correction block 570 with output TS, and a Link Layer subsystem 580 such as with MPE-FEC that has a hardware physical layer controlled by MPU 510 and an output for IP datagrams. Each of the stages in the telecommunications signal processing chain is configured, controlled and monitored by MPU 510 to any suitable extent defined by the implementer.

MPU 510 communicates with preprocessing hardware, accelerators and interfaces such as transport stream demultiplexer, MPE-FEC, CRC (cyclic redundancy checksum), serial interfaces WSPI/SDIO and other suitable blocks. Multiple elementary streams carry audio/video play, audio/video recording, file downloads, electronic service guide updates, entitlement management messages, e-mail, voice over packet (VOP/VoIP), security services and other services. Some elementary streams carry multiple services in the same elementary stream where some time multiplexing of the services is permissible.

In FIG. 5, Adjustable Memory_1 530 provides memory as in FIG. 4 for Frequency Domain Processing block 560 and part of Link Layer subsystem 580. Adjustable Memory_2 540 provides memory as in a replica of FIG. 4 for Forward Error Correction (FEC) block 570 and another part of Link Layer subsystem 580.

In FIG. 6, a system 600 has a system bus 605 supporting a telecommunications signal processing chain 610 with three stages coupled to Adjustable Memory 620 analogous to adjustable memory 220 of FIG. 4. A processor MPU 630 with RAMs/ROM 632 is coupled by duplex bus interface 635 to bus 605. MPU 630 handles enhanced packet mode (EPM) by providing FEC frame construction, data-group construction, datagram construction, and output encapsulation, FIC (fast information channel) parsing and MCI (multiplex configuration information) construction, PSI/SI (program specific information/service information) construction and FIDC (fast information data channel) construction, such as for T-DMB and DAB packet streams. An applications processor and digital baseband block APP/DBB 640 is coupled to bus 605 by a serial-to-parallel high-speed interface 645.

In FIG. 6, an MPE-FEC block 650 has configuration/control/monitoring register 652. MPE-FEC block 650 feeds video data output to MPU 630 and APP/DBB 640 via bus 605, interface 635 and interface 645. MPE-FEC block 650 is coupled to Adjustable Memory 620 such as the way bus Mux 441 is coupled to adjustable shared memory in FIG. 4. In FIG. 6, FEC block 660 has configuration/control/monitoring register 662 and FEC output to MPE-FEC block 650. FEC block 660 is coupled to Adjustable Memory 620 such as the way bus Mux 442 is coupled to memory 410.N in FIG. 4. In FIG. 6, FDP (Frequency Domain Processing) block 665 has configuration/control/monitoring register 668 and FDP output to FEC block 660. FDP block 665 is coupled to Adjustable Memory 620 such as the way bus Mux 440 is coupled to memory in FIG. 4. In FIG. 6, FFT block 670 has configuration/control/monitoring register 672 and supplies FFT output to FDP block 665. FFT 670 and a Time Domain and Synchronization block TDS 675 each have an input fed with a digital output from ADC 165 of FIG. 1. TDS 675 supplies an output to FFT block 670. FFT 670 and FDP 665 are both coupled to a Frequency Domain Synchronization block FDS 678.

In FIG. 6, MPU 630 configures, controls, and monitors the stages of the telecommunications processing chain 610 via the registers 652, 658, 662, 668, 672 coupled to system bus 605. A direct memory access DMA 684 and interrupt controller INTC 688 support MPU 630. A power, resets, and control management block PRCM 695 supplies power management and resets for the system 600.

Further in FIG. 6, the output of FEC block 660 is coupled to a Demux 655, which in turn is coupled to the MPU 630 and peripherals such as interfaces 645 via interconnecting system bus 605. The FEC block 660 provides one or more audio/video streams (DAB, DVB, MPEG2-TS, etc.) with transport stream packets and the streams are filtered according to packet ID (PID). A data mode has sub-channel filtering of packets to separate different services in the same elementary stream and to recover video frames. Address filtering of packets is also provided to select only packets intended and destined for this system 600 product unit. Packet filtering is also suitably provided to resist a denial-of-service (DoS) attack.

In FIG. 6, adjustable memory 620 is coupled with each of the telecommunication signal chain blocks for frequency domain processing (FDP), forward error correction (FEC) and for multi-protocol encapsulation forward error correction (MPE-FEC). Packets, data groups, and cyclic redundancy checksum (CRC) information are stored in the adjustable memory. The demux 655 and adjustable memory 620 are suitably coupled and controlled so that a stream from the FEC 660 is coupled to the adjustable memory 620 and the MPE-FEC 650 directly in some embodiments (such as in FIGS. 2 and 6) or indirectly via a packet filter and/or parsing and construction operations of MPU 630 as in FIG. 6, see lines 698 and 699. Reed-Solomon (RS) decoding for MPE-FEC 650 and enhanced packet mode are concurrently supported by the adjustable memory 620.

In FIG. 6, another example of an adjustable memory 620 provides a memory array that is plural-ported for both read and write. MPU 630 enters and adjusts mutually-exclusive memory ranges (e.g., base address and size) as memory configurations for each signal processing block in registers 652, 662 and 668. MPU 630 also sends adjustment control signals to additional bit fields in the registers 652, 662 and 668 to enable and disable taps or other signal processing circuits so that adjustable numbers of them are activated therein and so that the operation of MPE-FEC 650, FEC 660 and FDP 665 stay within configured-available amounts of memory in block 620. The respective blocks 650, 660, 665 are coupled to respective ports of the memory array 620 for contention-free concurrent access in their mutually-exclusive and configurably-adjustable memory ranges.

In FIG. 7, a dynamically configurable system 700 has a signal processing chain 705 analogous to FIGS. 1-6, together with a Lookup Table 710 to provide memory selection controls 715. Lookup Table 710 is responsive to operating conditions such as increasing or decreasing Doppler effect to dynamically configure and control adjustable memory 720. In FIG. 7, some embodiments dynamically trade off Doppler performance with transmission flexibility by support for a number ESN of multiple, concurrent MPE-FEC elementary streams. In signal processing chain 705, Doppler estimation 740 is fed by FFT tone separator 750, and Doppler estimation 740 in turn feeds a FEC block 660. FEC block 660 in turn feeds an MPE-FEC Link Layer 650.

Doppler estimation 740 feeds a comparator 724. The comparator 724 accesses Look-up Table 710 (or decoder logic to instantiate the same information in some embodiments). Lookup Table 710 provides memory bank selector outputs 715 that are routed to selector controls of Muxes 440, 441, etc., to dynamically govern the allocation in adjustable memory 720. Any two or more of Doppler estimation 740, FEC 660, and MPE-FEC Link Layer 650 are coupled via the Muxes 440, 441, etc., according to their respective allocation to adjustable memory 720. Memory bus lines 745 couple block 740 to a first input of each of two or more of the set of Muxes 440, 441, etc. Memory bus lines 755 couple MPE-FEC block 650 to a second input of each of two or more of the set of Muxes 440, 441, etc. In FIG. 7, memory bus lines 765 couple block 660 to a third input of each of two or more of the Muxes 440, 441, etc.

In FIG. 7, estimates based on a metric related to or as a function of Doppler effect due to relative velocity are successively established by Doppler estimation block 740 over time. A running process by comparator 724 receives, selects and analyzes those estimates by comparison with one or more thresholds 732 supplied and configured by MPU 730. In some embodiments, the Doppler or velocity or frequency offset estimates, e.g., derived from auto-correlation of pilot data received in successive OFDM symbols, are fed to a selector process block (e.g., comparator 724 and Lookup Table 710) that is based on the metric.

Tap selector lines 775 are dynamically selected and activated by Lookup Table 710 in a manner analogous to the bank selector outputs 715. Tap selector lines 775 from Lookup Table 710 couple back to Doppler Estimation block 740 to control the number of equalizer taps used by the circuitry in block 740 (compare output control Mux 920 and block 950 of FIG. 9 described later hereinbelow). The equalizer circuitry is operable to a more refined extent or to a less refined extent depending on the selected number of equalizer taps. The number of equalizer taps is varied in FIGS. 9 and 7 in response to Tap selectors 775. Varying the number of equalizer taps varies the amount of memory needed by Doppler Estimation block 740. As the amount of memory 720 that is needed by Doppler Estimation block 740 is varied by Tap Selectors 775, the actual amount of memory space that is coupled to Doppler Estimation block 740 is concurrently traded off by bank selectors 715. Bank selectors 715 adjust the selector controls to the Muxes 440, 441, etc., in FIG. 7.

In some dynamic selector embodiments, a block such as a FEC 660 or MPE-FEC block 650, instead of Doppler estimator block 740, counts an elementary streams number ESN and uses that number ESN instead of Doppler to dynamically drive the memory allocation through comparator 724 and Lookup Table 710. The threshold 725 and Lookup Table configuration 735 are flexibly alterable as between different system products. In some other dynamic selector embodiments, demands for MPE-FEC service along with Doppler memory demand are dynamically and jointly considered, jointly combined or jointly responded to, in order to determine the memory allocation. In FIG. 7, lines for elementary stream number ESN from MPE-FEC 450 and a line from FEC 660 are also routed to comparator 724 to illustrate joint control as well.

The adjustment control process is next considered based on a pair of generalized signal processing blocks A and B from a signal processing chain of any of FIGS. 1-6. Doppler estimator block 740 is an example of a first Block A that estimates what the complexity of the Doppler estimation/equalizer process needs to be and determines and selects the amount of memory in adjustable memory 720 required for that level of process complexity. Block 740 supplies a Doppler output to comparator 724. MPE-FEC 650 acts as a Block B that determines its own process complexity by counting the number of elementary streams ESN to process. Block B outputs memory demand information (using ESN as a proxy for memory demand, for instance) to comparator 724. The memory demand information specifies or indicates how much memory that Block B needs. Both block A and block B are requesting scarce memory. An allocating mechanism is controlled or fed by control circuitry. Comparator 724 and Lookup Table 710 together operate as an example of an allocating and memory-adjusting mechanism to control the multiplexers 441, 442, etc. The allocating mechanism responds to both block A and Block B to allocate or divide up an amount X of adjustable memory 720. One example of an allocation process allocates or divides the memory space approximately in the proportions given by formulas $AX/(A+B)$ and $BX/(A+B)$ represented by the amounts of memory demanded by Block A and Block B. The allocation approximates those formula proportions instead of being precisely equal to those proportions because the memory space is physically divided into discrete blocks.

In another jointly combined dynamic selector running process, an allocating mechanism receives, selects and analyzes respective memory demand estimates A, B, C, etc. from a Block A such as Doppler 740, a Block B such as MPE-FEC 650 counting elementary streams, and a Block C, e.g., FEC 660 based on number of elementary streams. A metric establishes a some function of the demand estimates, such as a linear function that allocates X amount of memory in the allocations or proportions $AX/(A+B+C)$ and $BX/(A+B+C)$ and $CX/(A+B+C)$. Adjustable memory 720 has memory blocks as in FIG. 4 that represent discrete amounts or blocks of memory corresponding to thresholds compared to the values corresponding to the just-described allocations or proportions. Accordingly, some embodiments use an arithmetic and logical process such as in MPU 730 instead of, or in addition to, comparator 724 to supply a digital output 725 to feed the Lookup Table 710.

Suppose, for example, that Doppler estimation requests five blocks (binary 101) of memory, FEC requests three blocks (binary 011) and MPE-FEC requests six blocks (binary 110). Shared memory space is limited, however, say to only eight (8) blocks. Signal line 725 carries all these requests as a composite request {101 011 110} to the Lookup Table 710. Corresponding to this request, Lookup Table 710 is already configured and loaded beforehand via line 735 by MPU 730 with predetermined bit-fields for Lookup Table 710. The predetermined bit fields represent selector controls to the muxes corresponding to any such composite request that gets delivered to Lookup Table 710 at run-time. Lookup Table 710 at run-time responds to the composite request {101 011 110}, for instance, to output a corresponding particular predetermined bit field that establishes 3 blocks for Doppler, 2 blocks for FEC, and 3 blocks for MPE-FEC, for instance, to total to eight 8 blocks.

Lookup Table 710 then produces selector controls to Muxes 440, 441, 442 to deliver all the space in adjustable memory 720 in the discrete amounts or blocks of memory that are actually present. One type of embodiment provides eight 3-input muxes 440-447 to service the eight blocks respectively. Let the Bank Selector 715 control signal values that choose one of the three inputs of each Mux be 01, 10, 11 respectively for Doppler (id=01), FEC (id=10), MPE-FEC (id=11). In response to the composite request {101 011 110}, the Lookup Table sends out control signal values 01,01,01, 10,10,11,11,11 to Muxes 440-447 respectively to identify the signal processing block identification (id) to which each of the muxes are thereby controlled to deliver memory spaces—3 blocks for Doppler, 2 blocks for FEC, and 3 blocks for MPE-FEC in this example.

Concurrently, Lookup Table 710 sends back Tap Selectors 775 value of 011 (decimal 3) back to block 740 so that block 740 operates with three equalizer taps according to the 3 blocks granted or established by Lookup Table 710 in this operational case. Control lines (not shown) analogous to Tap Selectors 775 also suitably go from Lookup Table 710 to each requesting Block B and Block C to indicate the respective granted amounts of memory or circuitry that Block B and Block C are permitted to employ.

Implementation suitably provides various embodiments that use more or fewer Muxes 442, etc. in FIG. 7 and more or fewer control lines in the Bank Selectors 715 and in the Tap Selectors 775. In some embodiments, a signal processing block directly probes adjustable memory 720 via the muxes 441, etc. to determine how much memory the block is granted, so that Tap Selectors 775 are arranged and generated internal to block 740. Some embodiments have MPU 730 provide control functions instead of the comparator 724 and Lookup Table 710, and MPU 730 sets register bits in MPU 730 for the Bank Selectors 715 and Tap Selectors 775. Other embodiments send the bank selector signals 715 themselves directly to the requesting blocks. Then the bank selectors are decoded or arithmetically converted into permitted memory address spaces or ranges granted to an address generator unit in each block for access. Thus, numerous alternative embodiments are provided by implementation to accommodate particular applications.

Figure 8:
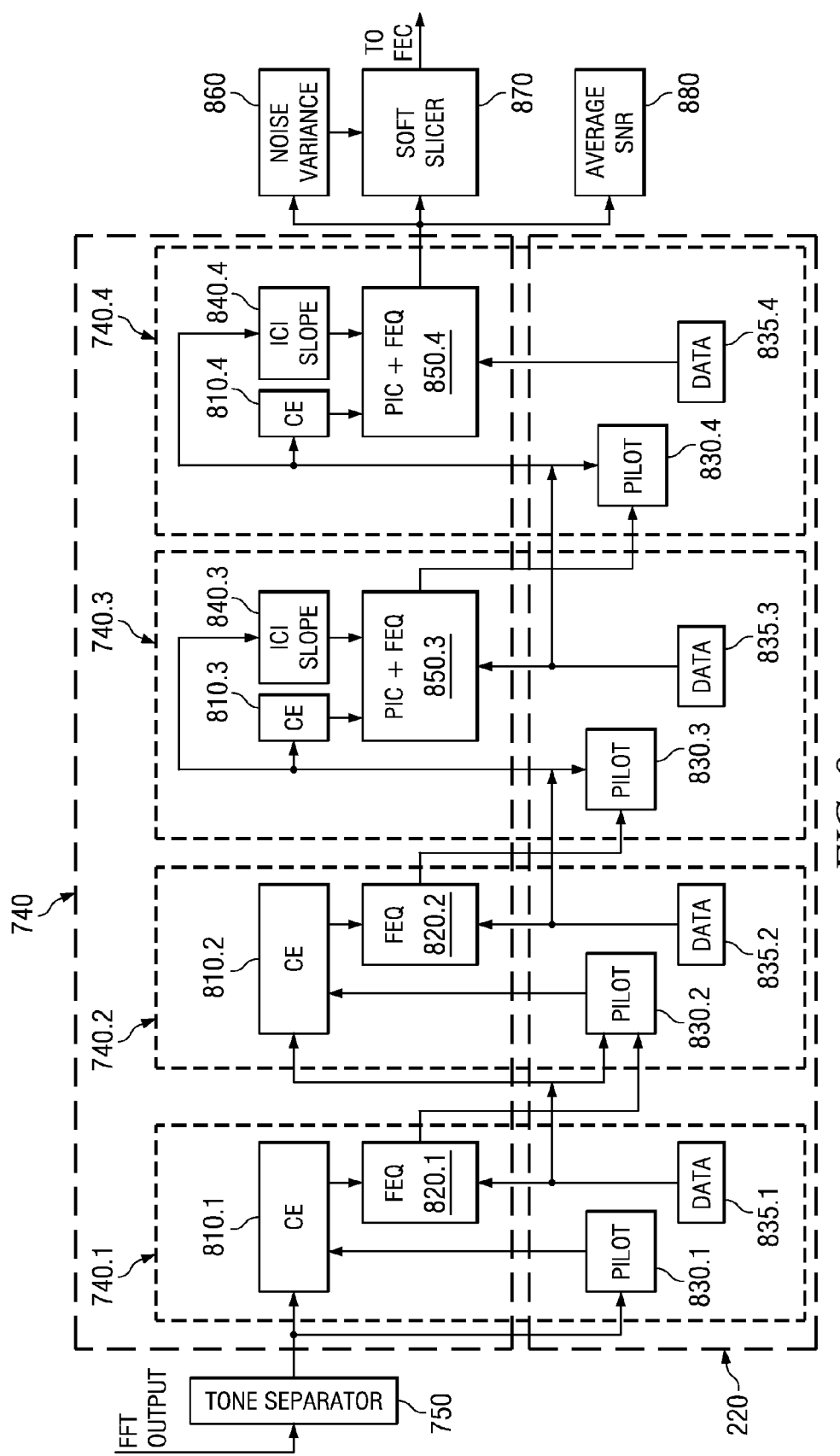
FIG. 8 is a block diagram of an inventive embodiment including a channel estimation portion of the signal processing chain of FIGS. 1, 2, 5, 6 and 7, together with portions of an adjustable memory.

In FIG. 8, a channel estimation portion of the signal processing chain of FIGS. 1, 2, 5, 6 and 7, is coupled with portions of the adjustable memory 220. FIG. 8 illustrates a process and memory usage for channel estimation software running on a DSP (digital signal processor), and also and alternatively represents hardware, process and memory usage for a channel estimation block implemented in dedicated hardware. Some background on channel estimation is provided in U.S. Pat. Application Publication 2006/0285484, (TI-60874) Ser. No. 11/424,939, filed Jun. 19, 2006, titled "Pilot Design and Channel Estimation," assigned to Texas Instruments Incorporated, said patent application publication hereby incorporated herein by reference; and U.S. Pat. No. 7,139,320 "Method and Apparatus for Multicarrier Channel Estimation and Synchronization Using Pilot Sequences" filed Oct. 11, 2001, assigned to Texas Instruments Incorporated and said patent is hereby incorporated herein by reference.

In FIG. 8, block 750 of FIG. 7 provides tone separation and phase descrambling. Doppler Estimation block 740 includes channel estimation for OFDM (orthogonal frequency division multiplex communication) and ICI (inter-channel interference) cancellation operating in a pipelined manner iteratively and concurrently in cascade. For example, a first iteration or first tap section 740.1 has plural tone spaced pilots and FEQ (frequency domain equalization) 820.1. The first iteration process has a first portion 830.1 for a Pilot memory 830 fed by the Tone separation and Phase Descrambling block 750 and has channel estimation 810.1 accessing that first portion 830.1 of the Pilot memory. Channel estimation 810.1 couples an output to FEQ block 820.1. A first portion 835.1 for a Data memory 835 is used by FEQ block 820.1. Pilot memory 830 and Data memory 835 each occupy space in adjustable memory 720 that depends on how many taps are selected in FIG. 7.

In FIG. 8, a second iteration or second tap section 740.2 has plural tone spaced pilots and FEQ 820.2. The second iteration process has a second portion 830.2 of Pilot memory fed by the first iteration FEQ 820.1 and by the first portion 835.1 of the Data memory. Channel estimation 810.2 in the second iteration is coupled to the second portion 830.2 of Pilot memory and feeds a second iteration FEQ block 820.2. Second FEQ block 820.2 uses a second portion of Data memory 835.2.

Next, a third iteration or third tap section 740.3 has plural tone spaced pilots, a channel estimation 810.3, a block 840.3 for ICI slope estimation, and a block 850.3 for PIC (parallel interference cancellation) and FEQ. The third iteration process has a third portion 830.3 of Pilot memory fed by the second iteration FEQ 820.2 and by the second portion 835.2 of the Data memory. Channel estimation 810.3 in the third iteration 740.3 and ICI slope estimation 840.3 are fed by the second portion 835.2 of Data memory and by the third portion 830.3 of Pilot memory. Channel estimation 810.3 and ICI slope estimation 840.3 feed respective outputs to the block 850.3 for PIC and FEQ. PIC and FEQ 850.3 use a third portion 835.3 of Data memory.

In this FIG. 8 example, a fourth or last iteration or tap section 740.4 has plural tone spaced pilots, a channel estimation 810.4, a block 840.4 for ICI slope estimation, and a block 850.4 for PIC and FEQ. The fourth iteration process has a fourth portion 830.4 of Pilot memory fed by the third iteration PIC+FEQ 850.3 and by the third portion 835.3 of the Data memory. Channel estimation 810.4 in the fourth iteration 740.4 and ICI slope estimation 840.4 are fed by the third portion 835.3 of Data memory and by the fourth portion 830.4 of Pilot memory. Channel estimation 810.4 and ICI slope estimation 840.4 feed respective outputs to the block 850.4 for PIC+FEQ. PIC+FEQ 850.4 use a fourth portion 835.4 of Data memory. Output from fourth iteration PIC+FEQ 850.4 goes to a Soft Slicer block 870 that feeds its output to the input of succeeding FEC block 660 in the signal processing chain of FIG. 7. PIC+FEQ 850.4 output also is fed to a Noise Variance estimation block 860 which in turn is coupled to Soft Slicer 870. PIC+FEQ 850.4 output also is fed to an Average SNR (signal to noise ratio) block 880.

Figure 9:
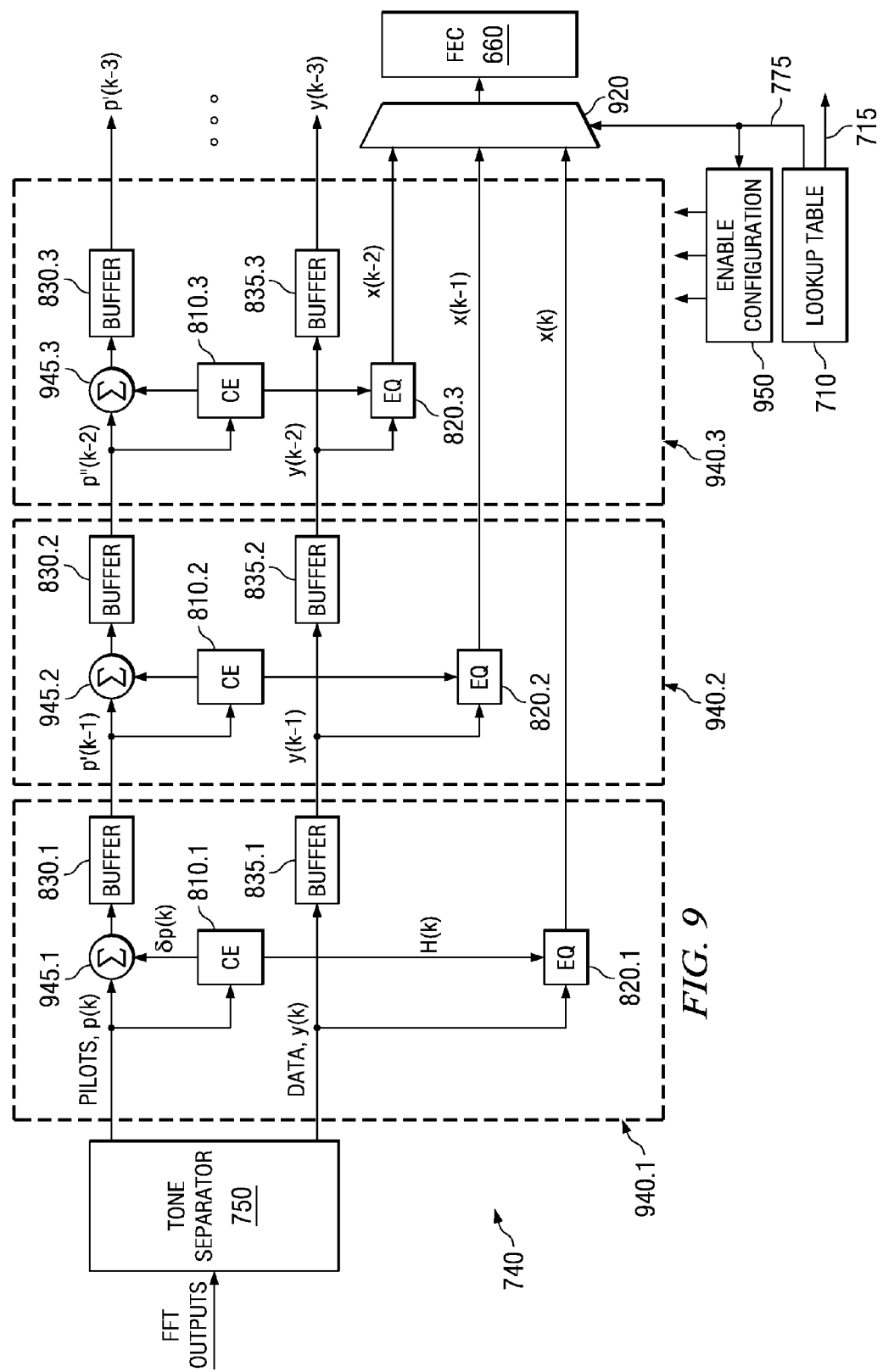
FIG. 9 is a block diagram of an inventive embodiment including a channel estimation portion of the signal processing chain of FIGS. 1, 2, 5, 6, 7 and 8, together with tap selection controls and selective coupling to an inventive adjustable memory for operation given various allocations of the inventive adjustable memory.

In FIG. 9, a channel estimation portion 740 of the signal processing chain of FIGS. 1, 2, 5, 6, 7 and 8, is selectively coupled to the adjustable memory 720 for functioning operation given any of various allocations of the memory 740 under the dynamic control of FIG. 7. Note that channel estimation 740 has a generally iterated structure as in FIG. 8 with tap sections (taps) 940.1, 940.2, 940.3 with additional one or more memory sections 830.*i*, 835.*i* devoted to each tap 940.*i*.

Note further that the Pilot memory portions 830.*i* and Data memory portions 835.*i* in FIG. 8 and occupy adjustable memory such as 220 or 720 of FIGS. 2, 4 and 7 or adjustable memory 320 of FIGS. 3A and 3B, or adjustable memory 530 of FIG. 5 or adjustable memory 620 of FIG. 6. Accordingly, muxing circuitry 441, 442, etc. of FIGS. 4 and 7 couples allocated blocks of adjustable memory 220 (or 720) to block 740 in FIGS. 8 and 9 for use as Pilot memory 830 and Data memory 835. Depending on embodiment, these allocated blocks of memory 220 or 720 are fully used in block 740 of FIGS. 8 and 9 by applying enabling circuitry and muxes to the hardware tap sections and/or establishing address space configurations and software bypasses in DSP software to the blocks in FIGS. 8 and 9.

In this way, the functional portions 830.$i$ of Pilot memory and the functional portions 835.$i$ of Data memory are variably established and deployed in block 740 depending on the memory allocation so that some particular number of the tap sections are operative.

The input to a Soft Slicer 870 in FIG. 8 is coupled from the last tap 740.$i$ for which memory is allocated. A soft slicer is described in U.S. Pat. No. 7,023,931 "System and Method for Soft Slicing" filed Nov. 5, 2001, assigned to Texas Instruments Incorporated and said patent is hereby incorporated herein by reference. On each carrier, quadrature amplitude modulation (QAM) signals are impressed in a constellation of QAM points in the IQ (in-phase, quadrature) domain. A slicer separates the QAM points or modulation signals of the constellation from each other. A soft slicer variably weights or tunes the positions of the constellation points depending on received signal conditions. These applied circuits and/or configurations are responsive to the memory allocations that are statically and dynamically established by embodiments as discussed in connection with FIG. 4 and FIG. 7.

FIG. 9 shows a process and memory usage diagram for channel estimation software running on a DSP (digital signal processor) or alternatively a block diagram of hardware, process and memory usage for a channel estimation block implemented in dedicated hardware. The teachings in connection with FIGS. 8 and 9 are suitably applied to each other. The teachings are applicable in the frequency domain and in the time domain. Analogously, other blocks like MPE-FEC in the telecommunications chain have iterated structures and/or parallel structures that consume an additional one or more memory sections devoted to each structure to provide additional performance, such as handling one or more elementary streams.

In FIG. 9, tone separator 750 feeds pilots p(k) and data y(k) to a multiple-tap structure for block 740. The multiple-tap structure has sub-blocks or tap sections 940.1, 940.2, 940.3, etc., that operate iteratively and concurrently in cascade. Channel estimation C.E. 810.1, 810.2, 810.3, etc. and equalization EQ 820.1, 820.2, 820.3, etc. are provided. For comparison with FIG. 8, Pilot buffers or portions of Pilot memory are designated 830.1, 830.2, 830.3, etc., and Data buffers or portions of Data memory are designated 835.1, 835.2, 835.3, etc. FIG. 9 illustrates an embodiment that responds to Lookup Table 710 delivery of Tap Selectors 775. The dynamic selector of FIG. 7 dynamically considers demands for service along with Doppler memory demand to determine the memory allocation.

In FIG. 9, in tap section 940.1, incoming pilot p(k) is fed to a C.E. 810.1 and to a first input of a summing process block 945.1. C.E. 810.1 delivers channel estimation corrections δp(k) to a second input of the summing process block 945.1, which delivers a summing arithmetical output to pilot buffer 830.1. Pilot buffer 830.1 holds the pilot input for the next tap section 940.2. Data input y(k) to tap section 940.1 is fed both to Equalizer EQ 820.1 and to Data buffer 835.1. Data buffer 835.1 buffers or time-delays the data y(k) destined for the subsequent tap section 940.2 as y(k−1). In tap section 940.1 meanwhile, C.E. 810.1 provides a channel estimate H(k) to a second input of Equalizer EQ 820.1. Equalizer EQ 820.1 produces an equalized output x(k) to a first input of a Mux 920.

Each of the tap sections 940.1, 940.2, 940.3, etc. provide successively more-refined equalized outputs x(k), x(k−1), x(k−2), etc. to the first, second, third, etc. inputs of the Mux 920. In general, the number of functioning tap sections, (e.g. 940.1 only; or 940.1 and 940.2 only; or all of 940.1, 940.2, 940.3) is limited and controlled by Tap Selectors 775. Tap Selectors 775 controls selector inputs of the Mux 920 to deliver as output from Mux 920 the highest numbered tap 940.$i$ output to which a current allocation from adjustable memory (e.g., 220) extends. Tap Selectors 775 is coupled to a block 950 providing tap-specific enabling circuits, selecting circuits, and configuring and bypassing for the tap sections. In this way, the tap sections starting with 940.1 are activated only as far as buffer spaces 830.$i$, 835.$i$ extend until the allocation from adjustable memory is entirely used up or consumed. All higher i-numbered tap sections 940.$i$ (beyond those taps that are given memory space) are inactive or disabled or bypassed. Analogously, other blocks in the telecommunications signal chain have sub-blocks that are enabled and configured to the extent of their respective block allocation from adjustable memory.

The improved circuits, structures and processes of FIGS. 1-9 are provided and adapted for use in each other and with the systems of FIGS. 1, 10 and 11 and all other systems to which their structures and processes commend their use.

In FIG. 10, an integrated circuit 1100 includes a digital baseband (DBB) block 1110 that has a RISC processor 1105 (such as MIPS core(s), ARM core(s), or other suitable processor) and a digital signal processor 1110 such as from the TMS320C55x™ DSP generation from Texas Instruments Incorporated or other digital signal processor (or DSP core) 1110, communications software and security software for any such processor or core, security accelerators 1140, and a memory controller. Security accelerators block 1140 provide additional computing power such as for hashing and encryption that are accessible, for instance, when the integrated circuit 1100 is operated in a security level enabling the security accelerators block 1140 and affording types of access to the security accelerators depending on the security level and/or security mode. The memory controller interfaces the RISC core 1105 and the DSP core 1110 to Flash memory 1025 and SDRAM 1024 (synchronous dynamic random access memory). On chip RAM 1120 and on-chip ROM 1130 also are accessible to the processors 1110 for providing sequences of software instructions and data thereto. A security logic circuit 1038 of FIGS. 10 and 11 has a secure state machine (SSM) to provide hardware monitoring of any tampering with security features. A Secure Demand Paging (SDP) circuit 1040 is provided for effectively-extended secure memory.

Digital circuitry 1150 on integrated circuit 1100 supports and provides wireless interfaces for any one or more of GSM, GPRS, EDGE, UMTS, and OFDMA/MIMO (Global System for Mobile communications, General Packet Radio Service, Enhanced Data Rates for Global Evolution, Universal Mobile Telecommunications System, Orthogonal Frequency Division Multiple Access and Multiple Input Multiple Output Antennas) wireless, with or without high speed digital data service, via an analog baseband chip 1200 and GSM/CDMA transmit/receive chip 1300. Digital circuitry 1150 includes a ciphering processor CRYPT for GSM ciphering and/or other encryption/decryption purposes. Blocks TPU (Time Processing Unit real-time sequencer), TSP (Time Serial Port), GEA (GPRS Encryption Algorithm block for ciphering at LLC logical link layer), RIF (Radio Interface), and SPI (Serial Port Interface) are included in digital circuitry 1150.

Digital circuitry 1160 provides codec for CDMA (Code Division Multiple Access), CDMA2000, and/or WCDMA (wideband CDMA or UMTS) wireless suitably with HSDPA/ HSUPA (High Speed Downlink Packet Access, High Speed Uplink Packet Access) (or 1xEV-DV, 1xEV-DO or 3xEV-DV) data feature via the analog baseband chip 1200 and RF GSM/CDMA chip 1300. Digital circuitry 1160 includes blocks MRC (maximal ratio combiner for multipath symbol combining), ENC (encryption/decryption), RX (downlink receive channel decoding, de-interleaving, viterbi decoding and turbo decoding) and TX (uplink transmit convolutional encoding, turbo encoding, interleaving and channelizing.). Blocks for uplink and downlink processes of WCDMA are provided.

Audio/voice block 1170 supports audio and voice functions and interfacing. Speech/voice codec(s) are suitably provided in memory space in audio/voice block 1170 for processing by processor(s) 1110. An applications interface block 1180 couples the digital baseband chip 1100 to an applications processor 1400. Also, a serial interface in block 1180 interfaces from parallel digital busses on chip 1100 to USB (Universal Serial Bus) of PC (personal computer) 2070. The serial interface includes UARTs (universal asynchronous receiver/transmitter circuit) for performing the conversion of data between parallel and serial lines. Chip 1100 is coupled to location-determining circuitry 1190 for GPS (Global Positioning System). Chip 1100 is also coupled to a USIM (UMTS Subscriber Identity Module) 1195 or other SIM for user insertion of an identifying plastic card, or other storage element, or for sensing biometric information to identify the user and activate features.

In FIG. 10, a mixed-signal integrated circuit 1200 includes an analog baseband (ABB) block 1210 for GSM/GPRS/EDGE/UMTS/HSDPA/HSUPA which includes SPI (Serial Port Interface), digital-to-analog/analog-to-digital conversion DAC/ADC block, and RF (radio frequency) Control pertaining to GSM/GPRS/EDGE/UMTS/HSDPA/HSUPA and coupled to RF (GSM etc.) chip 1300. Block 1210 suitably provides an analogous ABB for CDMA wireless and any associated 1xEV-DV, 1xEV-DO or 3xEV-DV data and/or voice with its respective SPI (Serial Port Interface), digital-to-analog conversion DAC/ADC block, and RF Control pertaining to CDMA and coupled to RF (CDMA) chip 1300.

An audio block 1220 has audio I/O (input/output) circuits to a speaker 1222, a microphone 1224, and headphones (not shown). Audio block 1220 has an analog-to-digital converter (ADC) coupled to the voice codec and a stereo DAC (digital to analog converter) for a signal path to the baseband block 1210 including audio/voice block 1170, and with suitable encryption/decryption activated.

A control interface 1230 has a primary host interface (I/F) and a secondary host interface to DBB-related integrated circuit 1100 of FIG. 10 for the respective GSM and CDMA paths. The integrated circuit 1200 is also interfaced to an I2C port of applications processor chip 1400 of FIG. 10. Control interface 1230 is also coupled via circuitry to interfaces in circuits 1250 and the baseband 1210.

A power conversion block 1240 includes buck voltage conversion circuitry for DC-to-DC conversion, and low-dropout (LDO) voltage regulators for power management/sleep mode of respective parts of the chip regulated by the LDOs. Power conversion block 1240 provides information to and is responsive to a power control state machine between the power conversion block 1240 and circuits 1250.

Circuits 1250 provide oscillator circuitry for clocking chip 1200. The oscillators have frequencies determined by one or more crystals. Circuits 1250 include a RTC real time clock (time/date functions), general purpose I/O, a vibrator drive (supplement to cell phone ringing features), and a USB On-The-Go (OTG) transceiver. A touch screen interface 1260 is coupled to a touch screen XY 1266 off-chip.

Batteries such as a lithium-ion battery 1280 and backup battery provide power to the system and battery data to circuit 1250 on suitably provided separate lines from the battery pack. When needed, the battery 1280 also receives charging current from a Charge Controller in analog circuit 1250 which includes MADC (Monitoring ADC and analog input multiplexer such as for on-chip charging voltage and current, and battery voltage lines, and off-chip battery voltage, current, temperature) under control of the power control state machine.

In FIG. 10 an RF integrated circuit 1300 includes a GSM/GPRS/EDGE/UMTS/CDMA RF transmitter block 1310 supported by oscillator circuitry with off-chip crystal (not shown). Transmitter block 1310 is fed by baseband block 1210 of chip 1200. Transmitter block 1310 drives a dual band RF power amplifier (PA) 1330. On-chip voltage regulators maintain appropriate voltage under conditions of varying power usage. Off-chip switchplexer 1350 couples wireless antenna and switch circuitry to both the transmit portion 1310, 1330 and the receive portion next described. Switchplexer 1350 is coupled via band-pass filters 1360 to receiving LNAs (low noise amplifiers) for 850/900 MHz, 1800 MHz, 1900 MHz and other frequency bands as appropriate. Depending on the band in use, the output of LNAs couples to GSM/GPRS/EDGE/UMTS/CDMA demodulator 1370 to produce the I/Q or other outputs thereof (in-phase, quadrature) to the GSM/GPRS/EDGE/UMTS/CDMA baseband block 1210.

Further in FIG. 10, an integrated circuit chip or core 1400 is provided for applications processing and more off-chip peripherals. Chip (or core) 1400 has interface circuit 1410 including a high-speed WLAN 802.11a/b/g interface coupled to a WLAN chip 1500. Further provided on chip 1400 is an applications processing section 1420 which includes a RISC processor 1422 (such as MIPS core(s), ARM core(s), or other suitable processor), a digital signal processor (DSP) 1424 such as from the TMS320C55x™ DSP generation from Texas Instruments Incorporated or other digital signal processor, and a shared memory controller MEM CTRL 1426 with DMA (direct memory access), and a 2D (two-dimensional display) graphic accelerator. Speech/voice codec functionality is suitably processed in chip 1400, in chip 1100, or both chips 1400 and 1100.

The RISC processor 1420 and the DSP 1424 in section 1420 have access via an on-chip extended memory interface (EMIF/CF) to off-chip memory resources 1435 including as appropriate, mobile DDR (double data rate) DRAM, and flash memory of any of NAND Flash, NOR Flash, and Compact Flash. On chip 1400, the shared memory controller 1426 in circuitry 1420 interfaces the RISC processor 1420 and the DSP 1424 via an on-chip bus to on-chip memory 1440 with RAM and ROM. A 2D graphic accelerator is coupled to frame buffer internal SRAM (static random access memory) in block 1440. A security block 1450 in security logic 1038 of FIG. 1 includes an SSM analogous to SSM 1038, and includes secure hardware accelerators having security features and provided for secure demand paging 1040 as further described herein and for accelerating encryption and decryption. A random number generator RNG is provided in security block 1450. Among the Hash approaches are SHA-1 (Secured Hashing Algorithm), MD2 and MD5 (Message Digest version #). Among the symmetric approaches are DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard). Among the asymmetric approaches are RSA, DSA, DH, NTRU, and ECC (elliptic curve cryptography). The security features contemplated include any of the foregoing hardware and processes and/or any other known or yet to be devised security and/or hardware and encryption/decryption processes implemented in hardware or software.

Security logic 1038 of FIG. 1 and FIG. 10 (1038, 1450) includes hardware-based protection circuitry, also called security monitoring logic or a secure state machine SSM. Security logic 1038, (1450) is coupled to and monitors busses and other parts of the chip for security violations and protects and isolates the protected areas. Security logic 1038 (1450) makes secure ROM space inaccessible, makes secure RAM and register space inaccessible and establishes any other appropriate protections to additionally foster security. In one embodiment such a software jump from Flash memory 1025 (1435) to secure ROM, for instance, causes a security violation wherein, for example, the security logic 1038 (1450) produces an automatic immediate reset of the chip. In another embodiment, such a jump causes the security monitoring logic 1038, (1450) to produce an error message and a re-vectoring of the jump away from secure ROM. Other security violations would include attempted access to secure register or RAM space.

On-chip peripherals and additional interfaces 1410 include UART data interface and MCSI (Multi-Channel Serial Interface) voice wireless interface for an off-chip IEEE 802.15 ("Bluetooth" and low and high rate piconet and personal network communications) wireless circuit 1430. Debug messaging and serial interfacing are also available through the UART. A JTAG emulation interface couples to an off-chip emulator Debugger for test and debug. Further in peripherals 1410 are an I2C interface to analog baseband ABB chip 1200, and an interface to applications interface 1180 of integrated circuit chip 1100 having digital baseband DBB.

Interface 1410 includes a MCSI voice interface, a UART interface for controls, and a multi-channel buffered serial port (McBSP) for data. Timers, interrupt controller, and RTC (real time clock) circuitry are provided in chip 1400. Further in peripherals 1410 are a MicroWire (u-wire 4 channel serial port) and multi-channel buffered serial port (McBSP) to Audio codec, a touch-screen controller, and audio amplifier 1480 to stereo speakers.

External audio content and touch screen (in/out) and LCD (liquid crystal display), organic semiconductor display, and DLP™ digital light processor display from Texas Instruments Incorporated, are suitably provided in various embodiments and coupled to interface 1410. In vehicular use, the display is suitably any of these types provided in the vehicle, and sound is provided through loudspeakers, headphones or other audio transducers provided in the vehicle. In some vehicles a transparent organic semiconductor display is provided on one or more windows of the vehicle and wirelessly or wireline-coupled to the video feed.

Interface 1410 additionally has an on-chip USB OTG interface couples to off-chip Host and Client devices. These USB communications are suitably directed outside handset 1010 such as to PC 1070 (personal computer) and/or from PC 1070 to update the handset 1010.

An on-chip UART/IrDA (infrared data) interface in interfaces 1410 couples to off-chip GPS (global positioning system block cooperating with or instead of GPS 1190) and Fast IrDA infrared wireless communications device. An interface provides EMT9 and Camera interfacing to one or more off-chip still cameras or video cameras 1490, and/or to a CMOS sensor of radiant energy. Such cameras and other apparatus all have additional processing performed with greater speed and efficiency in the cameras and apparatus and in mobile devices coupled to them with improvements as described herein. Further in FIG. 10, an on-chip LCD controller or DLP™ controller and associated PWL (Pulse-Width Light) block in interfaces 1410 are coupled to a color LCD display or DLP™ display and its LCD light controller off-chip and/or DLP™ digital light processor display.

Further, on-chip interfaces 1410 are respectively provided for off-chip keypad and GPIO (general purpose input/output). On-chip LPG (LED Pulse Generator) and PWT (Pulse-Width Tone) interfaces are respectively provided for off-chip LED and buzzer peripherals. On-chip MMC/SD multimedia and flash interfaces are provided for off-chip MMC Flash card, SD flash card and SDIO peripherals.

In FIG. 10, a WLAN integrated circuit 1500 includes MAC (media access controller) 1510, PHY (physical layer) 1520 and AFE (analog front end) 1530 for use in various WLAN and UMA (Unlicensed Mobile Access) modem applications. PHY 1520 includes blocks for Barker coding, CCK, and OFDM. PHY 1520 receives PHY Clocks from a clock generation block supplied with suitable off-chip host clock, such as at 13, 16.8, 19.2, 26, or 38.4 MHz. These clocks are compatible with cell phone systems and the host application is suitably a cell phone or any other end-application. AFE 1530 is coupled by receive (Rx), transmit (Tx) and CONTROL lines to WLAN RF circuitry 1540. WLAN RF 1540 includes a 2.4 GHz (and/or 5 GHz) direct conversion transceiver, or otherwise, and power amplifer and has low noise amplifier LNA in the receive path. Bandpass filtering couples WLAN RF 1540 to a WLAN antenna. In MAC 1510, Security circuitry supports any one or more of various encryption/decryption processes such as WEP (Wired Equivalent Privacy), RC4, TKIP, CKIP, WPA, AES (advanced encryption standard), 802.11i and others. Further in WLAN 1500, a processor comprised of an embedded CPU (central processing unit) is connected to internal RAM and ROM and coupled to provide QoS (Quality of Service) IEEE 802.11e operations WME, WSM, and PCF (packet control function). A security block in WLAN 1500 has busing for data in, data out, and controls interconnected with the CPU. Interface hardware and internal RAM in WLAN 1500 couples the CPU with interface 1410 of applications processor integrated circuit 1400 thereby providing an additional wireless interface for the system of FIG. 10.

Still other additional wireless interfaces such as for wideband wireless such as IEEE 802.16 "WiMAX" mesh networking and other standards are suitably provided and coupled to the applications processor integrated circuit 1400 and other processors in the system. WiMax has MAC and PHY processes and the illustration of blocks 1510 and 1520 for WLAN indicates the relative positions of the MAC and PHY blocks for WiMax. See also description of FIGS. 3A and 3B hereinabove.

In FIG. 10, a further digital video integrated circuit 1610 is coupled with a television antenna 1615 (and/or coupling circuitry to share antenna 1015 and/or 1545) to provide television antenna tuning, antenna selection, filtering, RF input stage for recovering video/audio/controls from television transmitter (e.g., DVB station 2020 of FIG. 11). Digital video integrated circuit 1610 in some embodiments has an integrated analog-to-digital converter ADC on-chip, and in some other embodiments feeds analog to ABB chip 1200 for conversion by an ADC on ABB chip 1200. The ADC supplies a digital output to interfaces 1410 of applications processor chip 1400 either directly from chip 1610 or indirectly from chip 1610 via the ADC on ABB chip 1200. Applications processor chip 1400 includes a digital video block 1620 coupled to interface 1410 and having a configurable adjustable shared-memory telecommunications signal processing chain such as Doppler/MPE-FEC. See description of FIGS. 1-9. A processor on chip 1400 such as RISC processor 1422 and/or DSP 1424 configures, supervises and controls the operations the digital video block 1620.

In FIG. 11, an improved communications system 2000 has system blocks as described next and improved with any one, some or all of the circuits and subsystems shown in FIGS. 1-10. Any or all of the system blocks, such as cellular mobile telephone and data handsets 2010 and 2010', a cellular (telephony and data) base station 2050, a WLAN AP (wireless local area network access point, IEEE 802.11 or otherwise) 2060, a Voice over WLAN gateway 2080 with user voice over packet telephone 2085 (not shown), and a voice enabled personal computer (PC) 2070 with another user voice over packet telephone (not shown), communicate with each other in communications system 2000. Each of the system blocks 2010, 2010', 2050, 2060, 2070, 2080 are provided with one or more PHY physical layer blocks and interfaces as selected by the skilled worker in various products, for DSL (digital subscriber line broadband over twisted pair copper infrastructure), cable (DOCSIS and other forms of coaxial cable broadband communications), premises power wiring, fiber (fiber optic cable to premises), and Ethernet wideband network. Cellular base station 2050 two-way communicates with the handsets 2010, 2010', with the Internet, with cellular communications networks and with PSTN (public switched telephone network).

In this way, advanced networking capability for services, software, and content, such as cellular telephony and data, audio, music, voice, video, e-mail, gaming, security, e-commerce, file transfer and other data services, internet, world wide web browsing, TCP/IP (transmission control protocol/ Internet protocol), voice over packet and voice over Internet protocol (VoP/VoIP), and other services accommodates and provides security for secure utilization and entertainment appropriate to the just-listed and other particular applications.

The embodiments, applications and system blocks disclosed herein are suitably implemented in fixed, portable, mobile, automotive, seaborne, and airborne, communications, control, set top box 2090, television 2044 (receiver or two-way TV), and other apparatus. The personal computer (PC) 2070 is suitably implemented in any form factor such as desktop, laptop, palmtop, organizer, mobile phone handset, PDA personal digital assistant 2096, internet appliance, wearable computer, content player, personal area network, or other type.

For example, handset 2010 is improved for selectively determinable functionality, performance, security and economy when manufactured. Handset 2010 is interoperable and able to communicate with all other similarly improved and unimproved system blocks of communications system 2000. Camera 1490 provides video pickup for cell phone 1020 to send over the internet to cell phone 2010', PDA 2096, TV 2094, and to a monitor of PC 2070 via any one, some or all of cellular base station 2050, DVB station 2020, WLAN AP 2060, STB 2092, and WLAN gateway 2080. Handset 2010 has a video storage, such as hard drive, high density memory, and/or compact disk (CD) in the handset for digital video recording (DVR) such as for delayed reproduction, transcoding, and retransmission of video to other handsets and other destinations.

On a cell phone printed circuit board (PCB) 2020 in handset 2010, is provided a higher-security processor integrated circuit 1022, an external flash memory 1025 and SDRAM 1024, and a serial interface 1026. Serial interface 1026 is suitably a wireline interface, such as a USB interface connected by a USB line to the personal computer 1070 and magnetic and/or optical media 2075 when the user desires and for reception of software intercommunication and updating of information between the personal computer 2070 (or other originating sources external to the handset 2010) and the handset 2010. Such intercommunication and updating also occur via a processor in the cell phone 2010 itself such as for cellular modem, WLAN, Bluetooth from a website 2055 or 2065, or other circuitry 1028 for wireless or wireline modem processor, digital television and physical layer (PHY).

In FIG. 11, processor integrated circuit 1022 includes at least one processor (or central processing unit CPU) block 1030 coupled to an internal (on-chip read-only memory) ROM 1032, an internal (on-chip random access memory) RAM 1034, and an internal (on-chip) flash memory 1036. A security logic circuit 1038 is coupled to secure-or-general-purpose-identification value (Security/GPI) bits 1037 of a non-volatile one-time alterable Production ID register or array of electronic fuses (E-Fuses). Depending on the Security/GPI bits, boot code residing in ROM 1032 responds differently to a Power-On Reset (POR) circuit 1042 and to a secure watchdog circuit 1044 coupled to processor 1030. A device-unique security key is suitably also provided in the E-fuses or downloaded to other non-volatile, difficult-to-alter parts of the cell phone unit 1010.

The words "internal" and "external" as applied to a circuit or chip respectively refer to being on-chip or off-chip of the applications processor chip 1022. All items are assumed to be internal to an apparatus (such as a handset, base station, access point, gateway, PC, or other apparatus) except where the words "external to" are used with the name of the apparatus, such as "external to the handset."

ROM 1032 provides a boot storage having boot code that is executable in at least one type of boot sequence. One or more of RAM 1034, internal flash 1036, and external flash 1024 are also suitably used to supplement ROM 1032 for boot storage purposes.

FIG. 10 illustrates inventive integrated circuit chips including chips 1100, 1200, 1300, 1400, 1500, 1600 for use in the blocks of the communications system 2000 of FIG. 11. The skilled worker uses and adapts the integrated circuits to the particular parts of the communications system 2000 as appropriate to the functions intended. For conciseness of description, the integrated circuits are described with particular reference to use of all of them in the cellular telephone handsets 2010 and 2010' by way of example.

It is contemplated that the skilled worker uses each of the integrated circuits shown in FIG. 10, or such selection from the complement of blocks therein provided into appropriate other integrated circuit chips, or provided into one single integrated circuit chip, in a manner optimally combined or partitioned between the chips, to the extent needed by any of the applications supported by the cellular telephone base station 2050, personal computer(s) 2070 equipped with WLAN, WLAN access point 2060 and Voice WLAN gateway 2080, as well as cellular telephones, radios and televisions, Internet audio/video content players, fixed and portable entertainment units, routers, pagers, personal digital assistants (PDA), organizers, scanners, faxes, copiers, household appliances, office appliances, microcontrollers coupled to controlled mechanisms for fixed, mobile, personal, robotic and/ or automotive use, combinations thereof, and other application products now known or hereafter devised for increased, partitioned or selectively determinable advantages.

Figure 12:
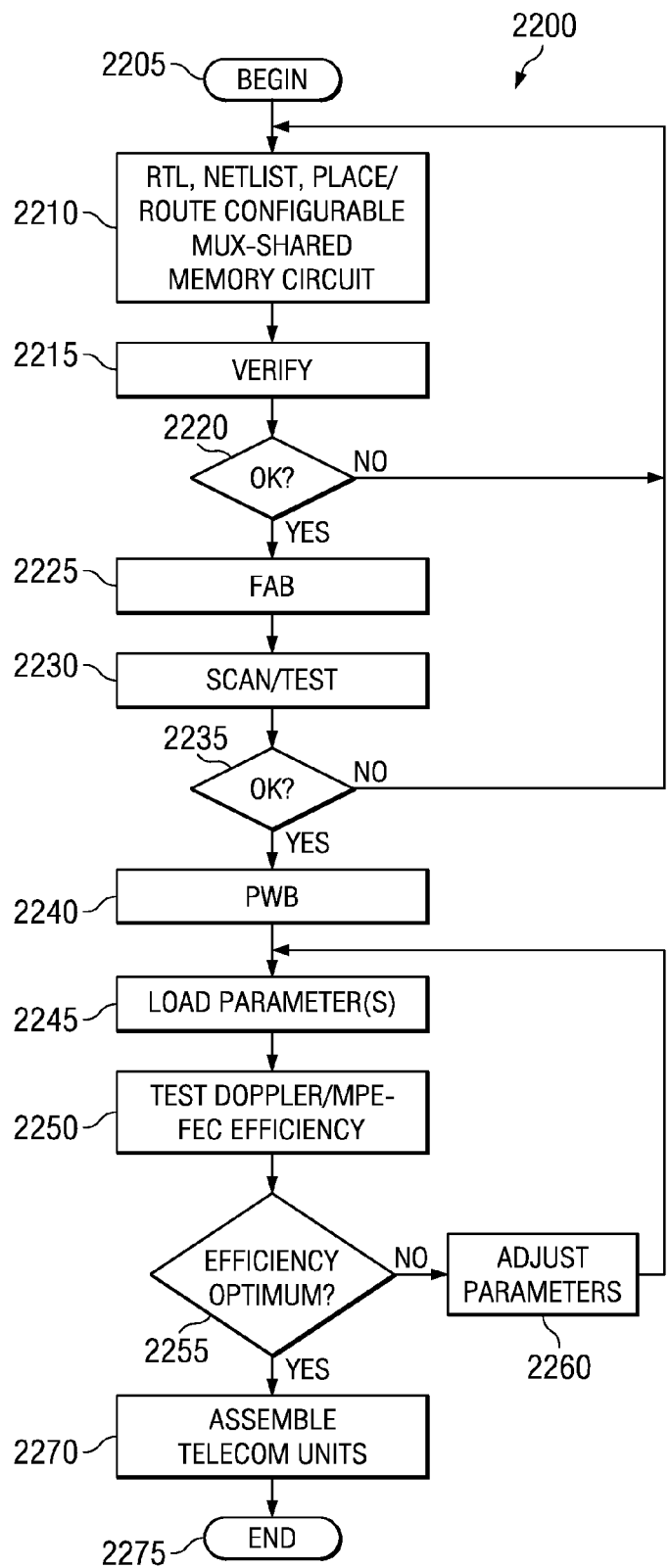
FIG. 12 is a flow diagram of an inventive process of manufacturing various inventive embodiments.

In FIG. 12, various embodiments of an integrated circuit improved as described herein are manufactured according to a suitable process of manufacturing and business process 2200 as illustrated in the flow of FIG. 12. The process begins at step 2205 and a step 2210 preparing RTL (register transfer language) and netlist for a particular design of one or more integrated circuits or a system as shown in one or more of the Figures of drawing herein as some examples and alternatives, and/or as described in the detailed description herein.

In a step 2215, the design of the configurable mux-shared memory circuitry, for instance, is verified in simulation electronically on the RTL and netlist. In this way, the contents and timing of the registers, operation of the circuits in various configurations and using the registers, are verified and the Doppler and MPE-FEC operations are verified. Dynamic reconfiguration of FIG. 7 is verified. The operations are verified pertaining to real-time and non-real-time operations and interrupts, and transitions through handlers, Monitor Mode, Secure Privilege modes, User mode, Debug modes, power management, and various attack scenarios. Then a verification evaluation step 2220 determines whether the verification results are currently satisfactory. If not, operations loop back to step 2210.

If verification evaluation 2220 is satisfactory, the verified design is provided in a manufacturing-ready form on a design information media, such as a design dataset, pattern generation dataset or the like, and fabricated in a wafer fab and packaged to produce a resulting integrated circuit at step 2225 according to the verified design. Then a step 2230 verifies the operations directly on first-silicon and production samples by using scan chain methodology on the page processing circuit. An evaluation decision step 2235 determines whether the chips are satisfactory, and if not satisfactory, the operations loop back as early in the process such as step 2210 as needed to get satisfactory integrated circuits.

Given satisfactory integrated circuits in step 2235, a telecommunications unit based on teachings herein is manufactured. With the configuration circuits and adjustable memory, conflicting requirement sets are accommodated and resolved in a single architecture that is configured into different products and product lines to ship to customer. See also description earlier hereinabove of this business process.

The process prepares in a step 2240 a particular design and printed wiring board (PWB) of the telecommunication unit having a telecommunications modem for wireless, DSL, cable, other wireline, optical, and other technology, a microprocessor coupled to the telecommunications modem, configurable adjustable memory support coupled to the telecommunications signal chain, and microprocessor, peripherals, and a user interface coupled to the microprocessor. Storage, such as SDRAM and Flash memory and on-chip secure memory, is coupled to the system and is provided with real-time operating system RTOS, Public HLOS, protected applications (PPAs and PAs), and other supervisory software.

The particular design of the configurable adjustable shared-memory embodiment is tested in a step 2250 by electronic simulation and prototyped and tested in actual application. Operation of the circuits and using the registers in various configurations selectively activating fields of a configuration register, for instance, are verified to confirm operations of the integrated circuit(s) and system and to perform verification and test operations that go beyond those operations earlier in the process. The verification and test operations pertaining to real-time and non-real-time operations, power management, various real-time scenarios such as multi-protocol operational scenarios for handling as many services and elementary streams as are specified for the system. Further testing evaluates and confirms system stability and satisfactory operation of mobile video display, phone, e-mails/data service, web browsing, voice over packet, content player, camera/imaging, video, microcontroller, and other such operation that is apparent to the human user and can be evaluated by system use. Also, various attack scenarios are applied in the test operations, such as by using real viruses, DoS attacks and other attacks.

Parameters of the circuitry, software and system are adjusted for in faster application execution, lower power dissipation, Doppler interference resistance, QoS (quality of service) for each communications service processed, and other pertinent metrics. Examples of parameters include enable/disable register bits in configuration register 460 of FIG. 4, comparator thresholds in FIG. 7, and contents of Lookup Table 760 of FIG. 7. If further increased efficiency is called for in step 2255, then adjustment or reconfiguration of the parameter(s) is performed in a step 2260, and operations loop back to reload the parameter(s) at step 2245 and do further testing. When the testing is satisfactory at step 2255, operations proceed to step 2270.

In manufacturing step 2270, the adjusted parameter(s) are loaded into the Flash memory or otherwise established in the integrated circuit(s) of the system. The components are assembled on a printed wiring board or otherwise as the form factor of the design is arranged to produce resulting telecommunications units according to the tested and adjusted design, whereupon operations are completed at END 2275.

Various embodiments are used with one or more microprocessors, each microprocessor having a pipeline is selected from the group consisting of 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), 10) multiple instruction multiple data (MIMD), 11) multiple-core using any one or more of the foregoing, and 12) microcontroller pipelines, control peripherals, and other microcontrol blocks using any one or more of the foregoing.

Various embodiments are implemented in any integrated circuit manufacturing process such as different types of CMOS (complementary metal oxide semiconductor), SOI (silicon on insulator), SiGe (silicon germanium), organic transistors, and with various types of transistors such as single-gate and multiple-gate (MUGFET) field effect transistors, and with single-electron transistors and other structures. Photonic integrated circuit blocks, components, and interconnects are also suitably applied in various embodiments.

Aspects (See Notes paragraph at end of this Aspects section.)

1A. The electronic circuit claimed in claim 1 further comprising a second signal processing circuit including at least two signal processing blocks connected in cascade, said memory circuit coupled to and adjustable between said at least two signal processing blocks of said second signal processing circuit.

1B. The electronic circuit claimed in claim 1A wherein said memory circuit is further configurable to establish a trade-off of the memory spaces between said at least two signal processing blocks of said second signal processing circuit.

1C. The electronic circuit claimed in claim 1 wherein at least two of the memory spaces are each readable and writable.

1D. The electronic circuit claimed in claim 1 wherein said first signal processing block is operable for Doppler performance, whereby signal processing is maintained when the electronic circuit is moved at a speed relative to a remote source.

1E. The electronic circuit claimed in claim 1 wherein said second signal processing block is operable to process multiple substantially-concurrent information streams.

1F. The electronic circuit claimed in claim 1 wherein said configuring circuit includes a microprocessor.

1G. The electronic circuit claimed in claim 1 wherein said configuring circuit is responsive to at least one of said signal processing blocks to dynamically establish the trade-off.

1H. The electronic circuit claimed in claim 1 further comprising a second signal processing circuit that includes a location-determining circuit coupled to said memory circuit.

4A. The signal processing device claimed in claim 4 wherein said taps are operable for equalization and provide respective equalizer outputs, and said signal processing device further comprises a multiplexer circuit fed by said equalizer outputs, and said multiplexer circuit has an output that provides a selected equalizer output.

4B. The signal processing device claimed in claim 4 wherein said first signal processing block is operable to provide channel estimation.

4C. The signal processing device claimed in claim 4 wherein said first signal processing block is further operable to provide inter-channel interference cancellation.

4D. The signal processing device claimed in claim 4 wherein said signal processing circuit is operable to process channels modulated with datagrams.

4E. The signal processing device claimed in claim 4 wherein said signal processing circuit is operable to process channels in a multi-carrier telecommunication.

4F. The signal processing device claimed in claim 4 wherein said second signal processing block is operable to recover plural substantially-concurrent elementary streams.

7A. The electronic circuit claimed in claim 7 wherein said control circuit is jointly responsive to said first and second signal processing blocks to dynamically establish the trade-off.

7B. The electronic circuit claimed in claim 7 wherein said control circuit includes a lookup table to dynamically establish the trade-off.

7C. The electronic circuit claimed in claim 7 further comprising a system controller coupled to said control circuit.

7D. The electronic circuit claimed in claim 7C wherein said system controller is operable to maintain a record of the amount of available memory space for at least one of said signal processing blocks.

7E. The electronic circuit claimed in claim 7D wherein said system controller is operable to increase and decrease entries in the record of the amount of available memory space in response a status change in a service.

7F. The electronic circuit claimed in claim 7D wherein said system controller is operable, in response to a request for an additional service, to determine that the memory needed for that service exceeds the memory available, and to issue a signal rejecting the request.

7G. The electronic circuit claimed in claim 7 wherein said control circuit is operable to dynamically adjust said memory circuit in response to received packets representing telecommunication under a first video protocol, and upon reception of different received packets representing telecommunication under a second video protocol to utilize said memory circuit for time-to-deliver.

7H. The electronic circuit claimed in claim 7G wherein said control circuit is operable upon reception of additionally-different received packets representing telecommunication under a third video protocol to utilize said memory circuit to trade off memory for Doppler and time-to-deliver.

11A. The power management circuit claimed in claim 11 wherein said memory circuit is controllable to trade-off Doppler performance with support for multiple concurrent packet streams.

11B. The power management circuit claimed in claim 11 wherein said memory circuit includes a multiplexing circuit for selectively coupling said first and second signal processing blocks to said memory spaces, said multiplexing circuit responsive to said power control circuit to establish the trade-off.

11C. The power management circuit claimed in claim 11B having a first clock line and a second clock line wherein said memory circuit includes a second multiplexing circuit selectively coupling said first clock line and said second clock line to said memory spaces, said second multiplexing circuit responsive to said power control circuit to establish the selective coupling of the first and second clock lines to said memory spaces.

11D. The power management circuit claimed in claim 11C wherein said first signal processing block is selectively coupled by said first multiplexing circuit to memory spaces that are also selectively coupled by said second multiplexing circuitry to said first clock line.

11E. The power management circuit claimed in claim 11D wherein said second signal processing block is selectively coupled by said first multiplexing circuit to memory spaces that are also selectively coupled by said second multiplexing circuitry to said second clock line.

11F. The power management circuit claimed in claim 11 wherein said power control circuit is operable to provide super-allocation of said memory circuit with a controllable part of the memory that is less powered or unpowered and with another controllable part of the memory that is fully powered.

11G. The power management circuit claimed in claim 11F wherein said power control circuit is operable to adjust memory space between the first and second signal processing blocks for the fully powered part of the memory.

11H. The power management circuit claimed in claim 11G for use with a signal processing circuit having memory demand related to Doppler and a number of one or more elementary streams, wherein said power control circuit is operable, when the memory demand due to Doppler and number of elementary streams is lower, to adjust said memory circuit to reduce memory space of the fully powered part of memory to conserve power until the memory demand rises.

11J. The power management circuit claimed in claim 11 further comprising a second signal processing circuit, wherein an at least three-way super-allocation is provided for fully-powered memory spaces in said memory circuit for said first-named signal processing circuit and said second signal processing circuit, and a less-power memory space in said memory circuit.

11K. The power management circuit claimed in claim 11 further comprising a clock rate control circuit coupled to said power control circuit.

11L. The power management circuit claimed in claim 11 wherein said signal processing circuit has at least three signal processing blocks, said memory circuit includes a multiplexing circuit for selectively coupling said signal processing circuit to the memory spaces, said multiplexing circuit has a plurality of multiplexers each having at least three inputs respectively coupled to the at least three signal processing blocks, and each of said multiplexers separately controlled by said power control circuit.

11M. The power management circuit claimed in claim 11 wherein said memory circuit includes a multiplexing circuit for selectively coupling said signal processing circuit to the memory spaces, and said memory circuit further includes a guaranteed memory space coupled together with said multiplexing circuit to at least one of said first and second signal processing blocks.

15A. The digital video receiver claimed in claim 15 wherein said configurable block includes a channel estimation circuit and an adjustable memory coupled to said channel estimation circuit.

15B. The digital video receiver claimed in claim 15 wherein said configurable block includes a channel estimation circuit for the Doppler performance, an MPE-FEC decoder, an adjustable memory coupled to both said channel estimation circuit and said MPE-FEC decoder, and a configuration register, said adjustable memory further coupled to said configuration register.

15C. The digital video receiver claimed in claim 15 wherein said configurable block includes a channel estimation circuit successively coupled with at least one decoder, a transport stream demultiplexer, and an MPE-FEC decoder.

15D. The digital video receiver claimed in claim 15 wherein said configurable block is operable to provide program specific information and to provide content datagrams.

15E. The digital video receiver claimed in claim 15 further comprising a power management block coupled to said configurable block.

15F. The digital video receiver claimed in claim 15 further comprising a wireless modem coupled to said microprocessor.

15G. The digital video receiver claimed in claim 15 for use with an antenna, the digital video receiver including an antenna signal block coupled to said configurable block and operable to receive a television signal.

15H. The digital video receiver claimed in claim 15 wherein said microprocessor is coupled to said configurable block and responsive to a service information event.

15J. The digital video receiver claimed in claim 15 further comprising a transport stream demultiplexer coupled to said configurable block and operable to provide at least one service information event to said microprocessor.

15K. The digital video receiver claimed in claim 15 further comprising a buffer coupled to said configurable block for content storage and replay later.

15L. The digital video receiver claimed in claim 15 further comprising a control circuit responsive to a condition to de-activate said configurable block.

15M. The digital video receiver claimed in claim 15 wherein said microprocessor has a first debug block, and said configurable block has second debug block coupled to said first debug block.

15N. The digital video receiver claimed in claim 15 further comprising a vehicular platform wherein said vehicular platform has a display and speaker coupled to said microprocessor.

22A. The process claimed in claim 22 wherein the first signal processing block includes a Doppler estimation circuit and the storage circuit configuration data additionally includes lookup table information for dynamically establishing the trade-off and indexed according to values related to Doppler estimation.

22B. The process claimed in claim 22 wherein the storage circuit configuration data additionally includes configuration data to control clocking of the allocated spaces by plural clocks.

22C. The process claimed in claim 22 further comprising combining the integrated circuit with a display.

25A. The digital communication apparatus claimed in claim 25 wherein different allocations of the memory spaces for said CE block vary its Doppler performance, and said apparatus further comprising a microprocessor operable for configuring an allocation of said adjustable memory circuit according to a particular regime selected from the group consisting of 1) a first regime for lower Doppler performance and fewer concurrent MPE-FEC elementary streams, 2) a second regime for higher Doppler performance with fewer concurrent MPE-FEC elementary streams, and 3) a third regime for lower Doppler performance with a higher number of concurrent MPE-FEC elementary streams.

25B. The digital communication apparatus claimed in claim 25 wherein said adjustable memory circuit includes a multiplexing circuit selectively coupling said CE block and said MPE-FEC block to said memory spaces, said multiplexing circuit configurable to establish the selective coupling.

25C. The digital communication apparatus claimed in claim 25 further comprising a first clock line and a second clock line wherein said adjustable memory circuit includes a second multiplexing circuit selectively coupling said first clock line and said second clock line to said memory spaces, said second multiplexing circuit responsive to said configuring circuit to establish the selective coupling of the first and second clock lines to said memory spaces.

25D. The digital communication apparatus claimed in claim 25 wherein said channel estimation block and said multi-protocol encapsulation forward error correction block are established in a digital signal processor.

25E. The digital communication apparatus claimed in claim 25D wherein said digital signal processor has at least one configuration register operable to allocate the memory spaces.

28A. The process claimed in claim 28 wherein the configuring step includes statically configuring information into the video receiver architecture.

28B. The process claimed in claim 28 wherein the process faces a varying customer order demand, and said configuring including dynamically supporting the varying customer order demand by configuring different numbers of units of said video receiver architecture product-specifically to the different products in response to the varying customer order demand.

28C. The process claimed in claim 28 wherein the configuring step includes dynamically operating the video receiver architecture of at least one product unit over time to dynamically trade off the Doppler performance with the number of elementary streams in testing.

Notes: Aspects are paragraphs which might be offered as claims in patent prosecution. The above dependently-written Aspects have leading digits and internal dependency designations to indicate the claims or aspects to which they pertain. Aspects having no internal dependency designations have leading digits and alphanumerics to indicate the position in the ordering of claims at which they might be situated if offered as claims in prosecution.

It is emphasized here that while some embodiments may have an entire feature totally absent or totally present, other embodiments, such as those performing the blocks and steps of the Figures of drawing, have more or less complex arrangements that execute some process portions, selectively bypass others, and have some operations running concurrently sequentially regardless. Accordingly, words such as "enable," "disable," "operative," "inoperative" are to be interpreted relative to the code and circuitry they describe. For instance, disabling (or making inoperative) a second function by bypassing a first function can establish the first function and modify the second function. Conversely, making a first function inoperative includes embodiments where a portion of the first function is bypassed or modified as well as embodiments where the second function is removed entirely. Bypassing or modifying code increases function in some embodiments and decreases function in other embodiments.

A few preferred embodiments have been described in detail hereinabove. It is to be understood that the scope of the invention comprehends embodiments different from those described yet within the inventive scope. Microprocessor and microcomputer are synonymous herein. Processing circuitry comprehends digital, analog and mixed signal (digital/analog) integrated circuits, ASIC circuits, PALs, PLAs, decoders, memories, non-software based processors, microcontrollers and other circuitry, and digital computers including microprocessors and microcomputers of any architecture, or combinations thereof. Internal and external couplings and connections can be ohmic, capacitive, inductive, photonic, and direct or indirect via intervening circuits or otherwise as desirable. Implementation is contemplated in discrete components or fully integrated circuits in any materials family and combinations thereof. Various embodiments of the invention employ hardware, software or firmware. Process diagrams herein are representative of flow diagrams for operations of any embodiments whether of hardware, software, or firmware, and processes of manufacture thereof.

While this invention has been described with reference to illustrative embodiments, this description is not to be construed in a limiting sense. Various modifications and combinations of the illustrative embodiments, as well as other embodiments of the invention may be made. The terms "including", "includes", "having", "has", "with", or variants thereof are used in the detailed description and/or the claims to denote non-exhaustive inclusion in a manner similar to the term "comprising". It is therefore contemplated that the appended claims and their equivalents cover any such embodiments, modifications, and embodiments as fall within the true scope of the invention.

What is claimed is:

1. An electronic circuit comprising a signal processing circuit including a signal processing chain comprising first and second signal processing blocks; a memory circuit coupled to and adjustable between the first and second signal processing blocks, said memory circuit having memory spaces; and a control circuit responsive to at least one of said signal processing blocks to dynamically adjust said memory circuit between said first and second signal processing blocks; wherein said first signal processing block is coupled to provide a Doppler-related signal to said control circuit, and said control circuit is responsive said Doppler-related signal to dynamically establish the trade-off; and wherein said second signal processing block is operable to process a plurality of substantially-concurrent signal streams, the streams being a varying N in number over time, and said second signal processing block is operable to generate a stream number signal related to the varying number N to said control circuit responsive to said stream number signal to dynamically establish the trade-off.

2. The electronic circuit claimed in claim 1 wherein said control circuit is operable, in response to a request for an additional service, to determine that an amount of memory space needed for the additional service exceeds an amount of available memory space in said memory circuit, and to issue a signal rejecting the request for the additional service.

3. A power management circuit comprising a signal processing circuit including first and second signal processing blocks coupled in cascade; a memory circuit coupled to and adjustable between the first and second signal processing blocks, the memory having memory spaces, said memory circuit controllable to establish a trade-off of the memory spaces between said first and second signal processing blocks; and a power control circuit operable to control the trade-off of the memory spaces of said memory circuit and to control the power used by said memory circuit; and wherein said first signal processing block is coupled to provide a Doppler-related signal to said power control circuit, and said power control circuit is responsive said Doppler-related signal to dynamically establish the trade-off; and wherein said second signal processing block is operable to process a plurality of substantially-concurrent signal streams, the streams being a varying N in number over time, and said second signal processing block is operable to generate a stream number signal related to the varying number N to said control circuit responsive to said stream number signal to dynamically establish the trade-off.

4. The power management circuit claimed in claim 3 further comprising a first clock line and a second clock line and wherein said memory circuit includes a multiplexing circuit selectively coupling said first clock line and said second clock line to said memory spaces, said multiplexing circuit responsive to said power control circuit to establish the selective coupling of the first and second clock lines to said memory spaces.

5. The power management circuit claimed in claim 3 wherein said power control circuit is further coupled to said signal processing circuit and operable to control the power used by said signal processing circuit.

6. A digital video receiver comprising a configurable block comprising adjustable memory spaces and operable to trade off Doppler performance with multi- protocol encapsulation forward error correction (MPE-FEC) by trading off spaces in said adjustable memory spaces as between circuitry for providing a Doppler-related signal and circuitry for providing the MPE-FEC, the circuitry for providing the MPE-FEC for processing a plurality of substantially-concurrent signal streams, the streams being a varying N in number over time, the varying number N responsive to said trading off; and a microprocessor coupled to said configurable block.

7. The digital video receiver claimed in claim 6 further comprising a display and a handheld enclosure, said display coupled to said microprocessor, said handheld enclosure enclosing said configurable block and said microprocessor.

8. The digital video receiver claimed in claim 6 further comprising a vehicular platform, whereby Doppler signal variations can occur.

9. A digital communication apparatus comprising a telecommunication signal chain having a physical layer block (PHY) operable to perform automatic retransmission request (ARQ) of packets, and said telecommunication signal chain having a media access controller (MAC) block operable to perform ARQ of packets; and an adjustable memory having memory spaces configurably allocated to trade off space in said adjustable memory as between said PHY ARQ block and to said MAC ARQ block, and circuitry for providing an increased amount of space in the adjustable memory to said PHY ARQ block while providing a decreased amount of space in the adjustable memory to said, MAC ARQ block and alternatively for providing a decreased amount of space in the adjustable memory to said PHY ARQ block while providing an increased amount of space in the adjustable memory to said MAC ARQ block.

10. The digital communication apparatus claimed in claim 9 wherein said telecommunication signal chain has bandwidth categories and is operable to transition between bandwidth categories, and said adjustable memory is responsive to such transition to dynamically reallocate space for said PHY ARQ block and said MAC ARQ block.

11. The digital communication apparatus claimed in claim 10 wherein said adjustable memory is responsive to such transition to dynamically allocate space for said PHY ARQ block depending on a next bandwidth category to which transition is made, and further responsive to trade off memory space for MAC ARQ memory when said PHY ARQ space increases.

12. A process of manufacturing an electronic device comprising providing an integrated circuit including a signal processing circuit including first and second signal processing blocks coupled in cascade, a memory circuit coupled to and adjustable between the first and second signal processing blocks and configurable to allocate a trade-off spaces for said first and second signal processing blocks, and a configuring circuit for configuring the trade-off of the memory spaces of said memory circuit; wherein said first signal processing block is coupled to provide a Doppler-related signal to said configuring circuit, and said configuring circuit is responsive said Doppler-related signal to dynamically establish the trade-off; and wherein said second signal processing block is operable to process a plurality of substantially-concurrent signal streams, the streams being a varying N in number over time, and said second signal processing block is operable to generate a stream number signal related to the varying number N to said configuring circuit responsive to said stream number signal to dynamically establish the trade-off; and coupling said integrated circuit with a storage circuit having configuration data representing a trade-off for use by the configuring circuit.

13. The process claimed in claim 12 wherein the storage circuit configuration data additionally includes lookup table information for dynamically establishing the trade-off 14. The process claimed in claim 12 further comprising coupling the integrated circuit with an automotive electronic circuit to manufacture an automotive electronic device.

15. A digital communication apparatus comprising a telecommunication signal chain having a channel estimation block (CE) taps for providing estimates of received data and a multi-protocol encapsulation forward error correction block (MPE-FEC); and an adjustable memory circuit having memory spaces configurably allocated for a tradeoff to the CE block and to the MPE-FEC block; and a configuring circuit operable to configure said memory circuit and said configuring circuit further having at least one tap selector line coupled to the CE block so that how many taps of said CE block are selected to couple to said memory circuit is coordinated with the tradeoff of the memory spaces in said memory circuit.

16. The digital communication apparatus claimed in claim 15 wherein said adjustable memory includes a plural-ported memory having plural ports for both read access and write access and plural busses coupling from said plural ports to at least said CE block and said MPE-FEC block respectively, and further comprising a configuration register circuit coupled to said plural ported memory to configurably allocate memory spaces in said plural-ported memory for use by at least said CE block and said MPE-FEC block.

17. A process of operation of an electronic circuit having first and second signal processing blocks and a memory having memory spaces, the process comprising: configuring a memory circuit to represent a trade-off of the memory spaces between said first and second signal processing blocks; adjusting the memory in response to the configuring to establish the trade-off of the memory spaces between the first and second signal processing blocks; wherein said first signal processing block is coupled to provide a Doppler-related signal and said adjusting step is responsive said Doppler-related signal to establish the trade-off; wherein said second signal processing block is operable to process a plurality of substantially-concurrent signal streams, the streams being a varying N in number over time, and said second signal processing block is operable to generate a stream number signal related to the varying number N to said adjust step is responsive to said stream number signal to establish the trade-off; and operating the signal processing blocks in accordance with the trade-off of the memory spaces.

18. The process claimed in claim 17 further comprising coordinating a tap selection in at least one of the signal processing blocks with the trade-off of the memory spaces.

19. The electronic circuit claimed in claim 1 wherein said control circuit is jointly responsive to said first and second signal processing blocks to dynamically establish the trade-off.

20. The electronic circuit claimed in claim 1 wherein said control circuit includes a lookup table to dynamically establish the trade-off 21. The electronic circuit claimed in claim 1 further comprising a system controller coupled to said control circuit, wherein said system controller is operable to maintain a record of the amount of available memory space for at least one of said signal processing blocks.

22. The electronic circuit claimed in claim 21 wherein said system controller is operable to increase and decrease entries in the record of the amount of available memory space in response a status change in a service.

23. The electronic circuit claimed in claim 1 wherein said control circuit is operable to dynamically adjust said memory circuit in response to received packets representing telecommunication under a first video protocol, and upon reception of different received packets representing telecommunication under a second video protocol to utilize said memory circuit for time-to-deliver.

24. The electronic circuit claimed in claim 23 wherein said control circuit is operable upon reception of additionally-different received packets representing telecommunication under a third video protocol to utilize said memory circuit to trade off memory for Doppler and time-to-deliver.

25. The power management circuit claimed in claim 3 wherein said memory circuit is controllable to trade-off Doppler performance with support for multiple concurrent packet streams.

26. The power management circuit claimed in claim 3:
wherein said memory circuit includes a multiplexing circuit for selectively coupling said first and second signal processing blocks to said memory spaces, said multiplexing circuit responsive to said power control circuit to establish the trade-off; and
having a first clock line and a second clock line wherein said memory circuit includes a second multiplexing circuit selectively coupling said first clock line and said second clock line to said memory spaces, said second multiplexing circuit responsive to said power control circuit to establish the selective coupling of the first and second clock lines to said memory spaces.

27. The power management circuit claimed in claim 26 wherein said first signal processing block is selectively coupled by said first multiplexing circuit to memory spaces that are also selectively coupled by said second multiplexing circuitry to said first clock line.

28. The power management circuit claimed in claim 3 wherein said power control circuit is operable to provide super-allocation of said memory circuit with a controllable part of the memory that is less powered or unpowered and with another controllable part of the memory that is fully powered.

29. The power management circuit claimed in claim 28 wherein said power control circuit is operable to adjust memory space between the first and second signal processing blocks for the fully powered part of the memory.

30. The power management circuit claimed in claim 29 for use with a signal processing circuit having memory demand related to Doppler and a number of one or more elementary streams, wherein said power control circuit is operable, when the memory demand due to Doppler and number of elementary streams is lower, to adjust said memory circuit to reduce memory space of the fully powered part of memory to conserve power until the memory demand rises.

31. The power management circuit claimed in claim 3 wherein said memory circuit includes a multiplexing circuit for selectively coupling said signal processing circuit to the memory spaces, and said memory circuit further includes a guaranteed memory space coupled together with said multiplexing circuit to at least one of said first and second signal processing blocks.

32. The digital video receiver claimed in claim 6 wherein said configurable block is operable to provide program specific information and to provide content datagrams.

33. The digital video receiver claimed in claim 6 further comprising a power management block coupled to said configurable block.

34. The digital video receiver claimed in claim 6 further comprising a wireless modem coupled to said microprocessor.

35. The digital video receiver claimed in claim 6 further comprising a buffer coupled to said configurable block for content storage and replay later.

36. The digital video receiver claimed in claim 6 further comprising a vehicular platform wherein said vehicular platform has a display and speaker coupled to said microprocessor.

37. The process claimed in claim 12 wherein the first signal processing block includes a Doppler estimation circuit and the storage circuit configuration data additionally includes lookup table information for dynamically establishing the trade-off and indexed according to values related to Doppler estimation.

38. The process claimed in claim 12 wherein the storage circuit configuration data additionally includes configuration data to control clocking of the allocated spaces by plural clocks.

39. The process claimed in claim 12 further comprising combining the integrated circuit with a display.

40. The digital communication apparatus claimed in claim 15 wherein different allocations of the memory spaces for said CE block vary its Doppler performance, and said apparatus further comprising a microprocessor operable for configuring an allocation of said adjustable memory circuit according to a particular regime selected from the group consisting of 1) a first regime for lower Doppler performance and fewer concurrent MPE-FEC elementary streams, 2) a second regime for higher Doppler performance with fewer concurrent MPE-FEC elementary streams, and 3) a third regime for lower Doppler performance with a higher number of concurrent MPE-FEC elementary streams.

41. The digital communication apparatus claimed in claim 15 wherein said adjustable memory circuit includes a multiplexing circuit selectively coupling said CE block and said MPE-FEC block to said memory spaces, said multiplexing circuit configurable to establish the selective coupling.

42. The digital communication apparatus claimed in claim 15 further comprising a first clock line and a second clock line wherein said adjustable memory circuit includes a second multiplexing circuit selectively coupling said first clock line and said second clock line to said memory spaces, said second multiplexing circuit responsive to said configuring circuit to establish the selective coupling of the first and second clock lines to said memory spaces.

43. The digital communication apparatus claimed in claim 15 wherein said channel estimation block and said multi-protocol encapsulation forward error correction block are established in a digital signal processor.

\* \* \* \* \*